US008041746B2

(12) United States Patent
Stuhec

(10) Patent No.: US 8,041,746 B2
(45) Date of Patent: Oct. 18, 2011

(54) MAPPING SCHEMAS USING A NAMING RULE

(75) Inventor: Gunther Stuhec, Heidelberg (DE)

(73) Assignee: SAP AG, Walldorf (DE)

( * ) Notice: Subject to any disclaimer, the term of this patent is extended or adjusted under 35 U.S.C. 154(b) by 372 days.

(21) Appl. No.: 11/981,454

(22) Filed: Oct. 30, 2007

(65) Prior Publication Data

US 2009/0112916 A1 Apr. 30, 2009

(51) Int. Cl.
*G06F 17/30* (2006.01)
*G06F 17/20* (2006.01)

(52) U.S. Cl. .................................. 707/802; 715/234

(58) Field of Classification Search .................. None
See application file for complete search history.

(56) References Cited

U.S. PATENT DOCUMENTS

| | | | |
|---|---|---|---|
| 6,560,608 B1 | 5/2003 | Tomm et al. | |
| 6,662,237 B1 | 12/2003 | Leckie | |
| 6,694,338 B1 | 2/2004 | Lindsay | |
| 6,757,739 B1* | 6/2004 | Tomm et al. | 709/236 |
| 2002/0095395 A1* | 7/2002 | Larson et al. | 706/47 |
| 2004/0083199 A1* | 4/2004 | Govindugari et al. | 707/1 |
| 2005/0033768 A1* | 2/2005 | Sayers et al. | 707/104.1 |
| 2005/0257193 A1* | 11/2005 | Falk et al. | 717/109 |
| 2005/0278139 A1 | 12/2005 | Glaenzer et al. | |
| 2006/0218158 A1* | 9/2006 | Stuhec et al. | 707/100 |
| 2007/0150495 A1* | 6/2007 | Koizumi et al. | 707/100 |
| 2007/0168381 A1* | 7/2007 | Fagin et al. | 707/102 |
| 2007/0179776 A1* | 8/2007 | Segond et al. | 704/9 |
| 2007/0203922 A1* | 8/2007 | Thomas | 707/100 |
| 2007/0239435 A1 | 10/2007 | Stuhec | |
| 2008/0306984 A1* | 12/2008 | Friedlander et al. | 707/102 |

OTHER PUBLICATIONS

C. Scroth, CCTS-based Business Information Modelling for Increasing Cross -Organization Interoperability, Aug. 29, 2007,Springer London, 467-478.*
Erhard Rahm, Philip A. Bernstein, A survey of approcahes to automatic schema matching, Feb. 5, 2001, Springer-Verlag, The VDLB Journal 10.*
Davis, J., *Context Tailor: Towards a Programming Model for Context-Aware Computing*, International Middleware Conference Workshop Proceedings—Middleware for Pervasive and Ad Hoc Computing, Jun. 16-20, 2003, Rio de Janeiro, Brazil, 68-75, 2003.
Oasis ebXML Registry TC[online], Oasis, 2005 [retrieved on Mar. 23, 2005]. Retrieved from the Internet: <URL: http://vvww.oasis-open.org/committees/tc_home.php?wg_abbrev=regrep>.

(Continued)

*Primary Examiner* — Tarek Chbouki
(74) *Attorney, Agent, or Firm* — Fish & Richardson P.C.

(57) ABSTRACT

Among other disclosed subject matter, a computer-implemented method for creating a mapping includes obtaining a definition relating to a first schema, the definition comprising a first plurality of nodes to be mapped to a second schema comprising a second plurality of nodes. The method includes receiving at least one context value for the received definition, the context value being associated with at least one context category defined for the second schema. The method includes generating names corresponding to each of the nodes in the first plurality, the generated names being consistent with a naming rule for the second schema. The method includes mapping each of the nodes in the first plurality to a respective one of the nodes in the second plurality, wherein the context value and at least one of the generated names are taken into account in the mapping.

24 Claims, 14 Drawing Sheets

OTHER PUBLICATIONS

GoXML Registry [online], Xenos, 2002 [retrieved on Mar. 23, 2005]. Retrieved from the Internet: <URL: http://www.xmlglobal.com/solutions/prod_goxml_registry.asp>.

The Company of The Open Standard Solutions [online], ebXMLsoft Inc., 2001-2004 [retrieved on Mar. 23, 2005]. Retrieved from the Internet: <URL: http://www.ebsmlsoft.com/ >.

Project: ebXML Registry/Repository: Summary [online], SourceForge.net, 2005 [retrieved on Mar. 23, 2005]. Retrieved from the Internet: <URL: http://sourceforge.net/projects/ebsmlrr >.

*Core Components Technical Specification V2.01—Part 8 of the ebXML Framework*, United Nations Centre for Trade Facilitation and Electronic Business, pp. 1-113, Nov. 15, 2003.

"Adobe LiveCycle Designer FAQ" Adobe Systems Incorporated, document undated, 3 pages.

XForms 1.1, W3C Working Draft Nov. 15, 2004, Obtained from the Internet at http://www.w3.org/TR/2004/WD-xforms11-20041115, on Dec. 6, 2004, 26 pages.

XML Schema, W3C, Obtained from the Internet http://www.w3.org/XML/Schema on Jan. 3, 2005, 16 pages.

XForms—The Next Generation of Web Forms, W3C, obtained from the Internet at http://vvww.w3.org/MarkUp/Forms, on Jan. 3, 2005, 11 pages.

XML Path Language (XPath) Version 1.0—W3C Recommendation Nov. 16, 1999, W3C, Obtained from the Internet at http://www.w3.org/TR/xpath, on Jan. 3, 2005, 37 pages.

InfoPath 2003 Product Overview, Microsoft Office Online, Obtained from the Internet at http://www.microsoft.com/office/infopath/prodinfo/overview.mspx, on Jan. 4, 2005.

AnHai Doan, Jayant Madhaven, Pedro Domingos, and Alon Halevy, "Learning to Map between Ontologies on the Semantic Web," May 2002, *Proceedings of the 11th International World Wide Web Conference*, pp. 662-673.

L. M. Haas, R. J. Miller, B. Niswonger, M. Tork Roth, P. M. Schwarz, and E. L. Wimmers, "Transforming Heterogeneous Data with Database Middleware: Beyond Integration," Copyright 1997, *Computer Society Technical Committee on Data Engineering*, pp. 1-6.

Hong-Hai Do and Erhard Rahm, "COMA—A system for flexible combination of schema matching approaches," Aug. 2002, *Proc. 28th Intl. Conference on Very Large Databases (VLDB)*, Hongkong, pp. 1-12.

Hong-Hai Do, Sergey Melnik, and Erhard Rahm, "Comparison of Schema Matching Evaluations," Oct. 2002, *Proc. GI-Workshop* "Web and Databases", Erfurt, pp. 1-15.

Jayant Madhavan, Philip A. Bernstein, and Erhard Rahm, "Generic Schema Matching with Cupid," 2001, *Proceedings of the 27th VLDB Conference*, pp. 49-58.

Jayant Madhaven, Philip A. Bernstein, and Erhard Rahm, "Generic Schema Matching with Cupid," Aug. 2001, *Microsoft Research*, MSR-TR-2001-58, pp. 1-15.

Sergey Melnik, Hector Garcia-Molina, and Erhard Rahm, "Similarity Flooding: A Versatile Graph Matching Algorithm and its Application to Schema Matching," 2002, *Proc. 18th Int'l Conf. on Data Engineering (ICDE)*, pp. 1-12.

Lucian Popa, Yannis Velegrakis, Renee J. Miller, Mauricio A. Hernandez, Ronald Fagin, "Translating Web Data," 2002, *Proceedings of the 28th VLDB Conference*, pp. 1-12.

Hong Su, Harumi, Kuno, and Elke A. Rundensteiner, "Automating the Transformation of XML Documents," 2001, *The ACM Digital Library*, pp. 68-75.

http://www.flexisoftsolutions.com/Products/SM2004/SM2004. aspx—*FlexiSoft Solutions*, obtained from the Internet on Jun. 24, 2005, 4 pages.

http://ww.notes.queensu.ca/uisadmin.nsf/579a5e3cc0e046c085256833007715cc/$FILE/queries_guide. pdf—BI/Query Queries Guide *Hummingbird, Ltd.*, obtained from the Internet on Jul. 18, 2005, 6 pages.

"Final Committee Draft ISO/IEC FCD—Information technology—Metadata registries (MDR)—Part 5: Naming and identification principles" ISO/IEC, document dated Jan. 8, 2004, 26 pages.

Goyal, "An XML Schema Naming Assister for Elements and Types," *National Institute of Standards and Technology*, document obtained at http://www.mel.nist.gov/msidlibrary/doc/NISTIR7143.pdf on Jun. 24, 2005, 11 pages.

"Information technology—Metadata registries (MDR)—Part 4: Formulation of data definitions," *ISO/IEC*, document dated Jul. 15, 2004, 16 pages.

"Information technology—Specification and standardization of data elements—Part 5: Naming and identification principles for data elements," *ISO/IEC*, document dated Dec. 1, 1995, 20 pages.

GEFEG EDIFIX, "EDIFIX Functions," [online], Xenos, 2002 [retrieved on Nov. 30, 2005]. <URL: http://www.gefeg.com/en/edifix/fx_functions.htm>.

"Information technology—Metadata Registries (MDR)—Part 1: Framework" International Standard ISO/IEC 11179-1; Sep. 15, 2004; (32 pages).

"Information technology—Metadata Registries (MDR)—Part 2: Classification"; International Standard ISO/IEC 11179-2; Nov. 15, 2005 (16 pages).

"Driving Automated Integration Today" [online]. Contivo [retrieved on Oct. 17, 2006]. Retrieved from the internet <URL: http://web.archive.org/web/20061017222738/http:/www.contivo.com/index.html>.

* cited by examiner

```
<!-- ABIE Documentation -->
<xsd:annotation>
  <xsd:documentation xml:lang="en">
    <ccts:UniqueID></ccts:UniqueID>                                              1102
    <ccts:Acronym>ABIE</ccts:Acronym>                                            1104
    <ccts:DictionaryEntryName></ccts:DictionaryEntryName>                        1106
    <ccts:Version></ccts:Version>                                                1108
    <ccts:Definition></ccts:Definition>                                          1110
    <ccts:ObjectClassTerm></ccts:ObjectClassTerm>                                1112
    <ccts:ObjectClassQualifier orderValue="1"></ccts:ObjectClassQualifier>       1114
    <ccts:UsageRule orderValue="1"></ccts:UsageRule>                             1116
    <ccts:BusinessTerm></ccts:BusinessTerm>                                      1118
    <ccts:Example></ccts:Example>                                                1120
  </xsd:documentation>
</xsd:annotation>
```

```xml
<?xml version="1.0" encoding="UTF-8"?>
<cod:BusinessContext>
        <UniqueID>[1201]</UniqueID>
        <VersionID>[1202]</VersionID>
        <BusinessInformationContextCategory excludedIndicator="[1203]" allContextValuesIndicator="[1204]">
                <!-- [1205] -->
                <BusinessInformationEntityID>[1206]</BusinessInformationEntityID>
                <BusinessDataTypeID>[1207]</BusinessDataTypeID>
        </BusinessInformationContextCategory>
        <BusinessProcessContextCategory excludedIndicator="[1203]" allContextValuesIndicator="[1204]">
                <!-- [1208] -->
                <BusinessProcessTypeCode>[1209]</BusinessProcessTypeCode>
                <BusinessTransactionTypeCode>[1210]</BusinessTransactionTypeCode>
                <BusinessTransactionMessageTypeCode>[1211]</BusinessTransactionMessageTypeCode>
        </BusinessProcessContextCategory>
        <BusinessProcessRoleContextCategory excludedIndicator="[1203]" allContextValuesIndicator="[1204]">
                <!-- [1212] -->
                <PartyFunctionCode>[1213]</PartyFunctionCode>
        </BusinessProcessRoleContextCategory>
        <SupportingRoleContextCategory excludedIndicator="[1203]" allContextValuesIndicator="[1204]">
                <!-- [1214] -->
                <SupporterFunctionCode>[1215]</SupporterFunctionCode>
        </SupportingRoleContextCategory>
        <IndustryClassificationContextCategory excludedIndicator="[1203]" allContextValuesIndicator="[1204]">
                <!-- [1216] -->
                <IndustryTypeCode>[1217]</IndustryTypeCode>
        </IndustryClassificationContextCategory>
        <ProductClassificationContextCategory excludedIndicator="[1203]" allContextValuesIndicator="[1204]">
                <!-- [1218] -->
                <ProductTypeCode>[1219]</ProductTypeCode>
        </ProductClassificationContextCategory>
        <GeopoliticalContextCategory excludedIndicator="[1203]" allContextValuesIndicator="[1204]">
                <!-- [1220] -->
                <ContinentCode>[1221]</ContinentCode>
                <CountryCode>[1222]</CountryCode>
                <RegionCode>[1223]</RegionCode>
                <LanguageCode>[1224]</LanguageCode>
        </GeopoliticalContextCategory>
        <OfficialConstraintsContextCategory excludedIndicator="[1203]" allContextValuesIndicator="[1204]">
                <!-- [1225] -->
                <LawTypeCode>[1226]</LawTypeCode>
        </OfficialConstraintsContextCategory>
        <SystemCapabilitiesContextCategory excludedIndicator="[1203]" allContextValuesIndicator="[1204]">
                <!-- [1227] -->
                <SoftwareSolutionID>[1228]</SoftwareSolutionID>
                <SchemaLibraryID>[1229]</SchemaLibraryID>
        </SystemCapabilitiesContextCategory>
        <UserContextCategory excludedIndicator="[1203]" allContextValuesIndicator="[1204]">
                <!-- [1230] -->
                <PartyID>[1231]</PartyID>
        </UserContextCategory>
</cod:BusinessContext>
```

```
<SourceSchemaArtefact>
    <Documentation xml:lang="en-US">           <!-- [1301] -->
        <Name>[1302]</Name>
        <Description>[1303]</Description>
    </Documentation>
    <Syntax>                                    <!-- [1304] -->
        <TypeCode>[1305]</TypeCode>
        <ArtefactTypeCode>[1306]</ArtefactTypeCode>
        <ArtefactName typeCode="StartTag">[1307]</ArtefactName>
        <ArtefactBaseType>[1308]</ArtefactBaseType>
        <FixedLengthIndicator>[1309]</FixedLengthIndicator>
        <FixedLengthValue>[1310]</FixedLengthValue>
        <SeparationSign typeCode="StartPreSign" omitIndicator="TRUE">[1311]</SeparationSign>
    </Syntax>
    <Content>                                   <!-- [1312] -->
        <Example>[1313]</Example>
        <Default>[1314]</Default>
        <Fixed>[1315]</Fixed>
        <LengthValue>[1316]</LengthValue>
        <MinimumLengthValue>[1317]</MinimumLengthValue>
        <MaximumLengthValue>[1318]</MaximumLengthValue>
        <TotalDigitsValue>[1319]</TotalDigitsValue>
        <FractionDigitsValue>[1320]</FractionDigitsValue>
        <WhiteSpaceCode>[1321]</WhiteSpaceCode>
        <Pattern>[1322]</Pattern>
        <Facet typeCode="minInclusive">[1323]</Facet>
        <FixedLengthFillSigns typeCode="left">[1324]</FixedLengthFillSigns>
    </Content>
    <Position>                                  <!-- [1325] -->
        <XPath>[1326]</XPath>
        <TriggerIndicator>[1327]</TriggerIndicator>
        <QualifiesArtefact>[1328]</QualifiesArtefact>
    </Position>
    <Processing>                                <!-- [1329] -->
        <Rule typeCode="XSLT" direction="in" orderNumber="1">[1330]</Rule>
    </Processing>
</SourceSchemaArtefact>
```

FIG. 13

MAPPING SCHEMAS USING A NAMING RULE

INCORPORATION-BY-REFERENCE & TEXT

The material on the accompanying compact discs is hereby incorporated by reference into this application. The accompanying compact discs contain one file, Computer Program Listing, which was created on Sep. 9, 2011. The file named Computer Program Listing is 140 kb. The file can be accessed using Microsoft Word on a computer that uses Windows OS.

TECHNICAL FIELD

This document relates to creating a mapping.

BACKGROUND

Many aspects of electronic communication, and in particular electronic commerce, is based on business documents that parties can exchange over a computer connection. A big problem in current e-Business is the variety in structure and description of business information and business documents. The absence of uniform and standardized methods for the common representation of the structure and semantics of business data has led to today's situation where there is an increasing growth of different representations of electronic business information and documents. It may not be possible to exchange business documents electronically between two business partners without previous coordination and manual mapping between different document structures and semantics. A world-wide accepted syntax for representation exists with extensible markup language (XML), but this does not solve the problem of non-uniform semantics and structure.

Some business documents are based on reusable building blocks that define the semantics of the document data. An example of a standard that defines such building blocks is the electronic business XML (ebXML) Core Components Technical Specification issued by the United Nations Centre for Trade Facilitation and Electronic Business. This specification is also known as the ISO 15000-5 standard, and is hereafter referred to as CCTS. The CCTS is the first standard which combines all necessary aspects for human legibility and automatic machine processing so that an integrated interoperability can be guaranteed. The CCTS-based building blocks are syntax free and very flexible, because they are based on a modular concept. Business information can be assembled for all demands by reusable building blocks. "Syntax free" means that these building blocks, called Core Components or "CCs" and Business Information Entities or "BIEs", represents only the business semantic (meaning) and can be generated in arbitrary representations, like XML, ABAP Objects or Java classes. However, the semantics described by the CCs in accordance with the CCTS do not change. This guarantees one general naming convention for the unambiguous composition of semantic information. A number of conventions within the CCTS (e.g., a naming convention) guarantee that the semantic information in each CC is unambiguous. This mechanism is comparable with the grammar and words of a naturally-spoken language, because a naturally-spoken language can also be represented in many different ways (by writing or by speech), and the semantics are always the same.

Sometimes, two enterprises that wish to transact electronic business use communication schemas that are incompatible with one another (for e.g. a CIDX Purchase Order and a RosettaNet Purchase Order). If a system generates an electronic document using a first communication schema and sends the document directly to another system that uses a different communication schema, the other system is unable to interpret the electronic document because it lacks information for mapping business data elements between different schemas. The other system may therefore use a translation infrastructure to translate electronic documents from the first communication schema format to an intermediary communication schema format and then from the intermediary communication schema format to the second communication schema format. The translation between the schemas must be made manually, and because of the complexity of the schemas not all entities will be translated. This can lead to loss of knowledge.

While the use of an ordinary intermediary schema formats is common, it may, however, have some disadvantages. Particularly, from time to time there is a need to integrate a new schema into the system. This tends to result in more and more extensions of the intermediary format. Solutions such as XML schema specific extensions may not be particularly helpful to the extent they consider a kind of extension in only one dimension. Especially extensions that consider some similar and slightly different parts must be structurally separated. Therefore, the so called one dimension extension may not be helpful for consolidating parts that are semantically the same. That is, due to structural and semantical mismatches in the different sources, the intermediary format is typically extended for the new format and, as a result, the intermediary schema continually grows and becomes more fragmented. In the end, such a situation may not offer any real advantage over creating direct mappings between the different sources.

SUMMARY

In a first aspect, a computer-implemented method for creating a mapping includes obtaining a definition relating to a first schema, the definition comprising a first plurality of nodes to be mapped to a second schema comprising a second plurality of nodes. The method includes receiving at least one context value for the received definition, the context value being associated with at least one context category defined for the second schema. The method includes generating names corresponding to each of the nodes in the first plurality, the generated names being consistent with a naming rule for the second schema. The method includes mapping each of the nodes in the first plurality to a respective one of the nodes in the second plurality, wherein the context value and at least one of the generated names are taken into account in the mapping.

Implementations can include any, all or none of the following features. The received definition can be at least one of: the first schema; and a mapping between the first schema and a third schema. A user can enter the at least context value to be associated with the definition. The generation of each of the names can include receiving a definition of a data element for which a unique name is to be created that complies with a predefined name format, the definition comprising human-understandable descriptive language, the data element identifying an information category in an electronic communication; identifying a noun phrase and a verb phrase in the definition; and generating the name using a first noun obtained from the noun phrase and a second noun obtained from the verb phrase. Identifying the noun phrase and the verb phrase can include generating a hierarchical tree for the definition. The predefined name format can require the unique name to comprise at least a first term for an object class to which the data element relates, and the second noun can be used as the first term. The predefined name format can require the unique name to comprise also a second term for a property of the object class, and another noun associated with the verb phrase can be used as the second term. The predefined name format can require the unique name to comprise also a third term for a representation form of the data element, and the first noun can be used as the third term. The method can further include combining the context value, the generated names and also additional information obtained from the definition in a data structure; and using the data structure in the mapping. The mapping can include an iterative process. The iterative process can include multiple matcher units, each matching unit corresponding to a matching based on at least one aspect relating to the definition, including a context value matcher using the at least one context value, and a name matcher using the generated names. In the iterative process there can be determined, for each node in the definition, a probability for the node to be mapped to each of the nodes in the second plurality. Each of the nodes in the first plurality can be mapped by associating it with one of the nodes in the second plurality based on at least some of the determined probabilities. There can be a weighting of the matchers so that at least one of the matchers is weighted compared to remaining matchers. The method can further include determining that there are ambiguous mappings between the first schema and the second schema; in response to the determination, revising the weighting by changing the weight of at least one of the matchers relative to remaining matchers; and performing the iterative procedure using the revised weighting. The method can further include presenting the mapping to a user as a suggestion which the user can at least accept or reject. The user can accept the suggestion, and the method can further include adding the at least one context value to the node in the second plurality. Obtaining the definition relating to the first schema can include obtaining a definition of an initial schema that does not comply with a standard for the second schema; and transforming the received initial schema into the first schema, the transformation providing that the first schema complies with the standard for the second schema. The standard can be CCTS and the transformation can provide the first schema with a CCTS-based notation. The transformation can associate the first schema with a primary construct that includes at least: a complex type entity; and a global declared element. The transformation can associate the first schema with a documentation schema that includes at least a definition of a message that is embodied in the initial schema. The transformation can associate the first schema with a business context schema configured to specify a context in any of a plurality of predefined context categories. The transformation can associate the first schema with a source schema artifact that includes at least a syntax element with information of a specific syntax.

In a second general aspect, a computer program product is tangibly embodied in a computer-readable storage medium and includes instructions that when executed by a processor perform a method for creating a mapping. The method includes obtaining a definition relating to a first schema, the definition comprising a first plurality of nodes to be mapped to a second schema comprising a second plurality of nodes. The method includes receiving at least one context value for the received definition, the context value being associated with at least one context category defined for the second schema. The method includes generating names corresponding to each of the nodes in the first plurality, the generated names being consistent with a naming rule for the second schema. The method includes mapping each of the nodes in the first plurality to a respective one of the nodes in the second plurality, wherein the context value and at least one of the generated names are taken into account in the mapping.

In a third general aspect, a computer program product is tangibly embodied in a computer-readable storage medium and includes instructions that, when executed, generate on a display device a graphical user interface for creating a mapping. The graphical user interface includes a first input area for making a first user entry identifying a definition relating to a first schema, the definition comprising a first plurality of nodes to be mapped to a second schema comprising a second plurality of nodes. The graphical user interface includes a second input area for making a second user entry identifying at least one context value for the definition, the context value being associated with at least one context category defined for the second schema. Names corresponding to each of the nodes in the first plurality are generated after receipt of the first user entry, the generated names being consistent with a naming rule for the second schema; and a mapping of each of the nodes in the first plurality to a respective one of the nodes in the second plurality is generated after receipt of the second user entry, the context value and at least one of the generated names being taken into account in the mapping.

Advantages of implementations can include any, all or none of the following: providing an improved creation of a semi automatic mechanism of mapping between two schemas; providing a context-dependent procedure for relating schemas with each other; providing an automated approach to matching with increased sensitivity and flexibility; providing improved specification of mappings between semantically appropriate entities; provide improved reusability by reusing semantically correct entities; reducing modification within types; providing an automatic evolutionary generation of appropriate entities in an intermediary schema during mapping of external schemas; providing an evolutionary and semi-automatic knowledge enrichment; and providing a hybrid matcher with better time performance.

The details of one or more embodiments are set forth in the accompanying drawings and the description below. Other features and advantages will be apparent from the description and drawings, and from the claims.

DESCRIPTION OF DRAWINGS

FIGS. 10-13 show examples of code representations of a schema in a ready to map format.

Like reference symbols in the various drawings indicate like elements.

DETAILED DESCRIPTION

Figure 1:
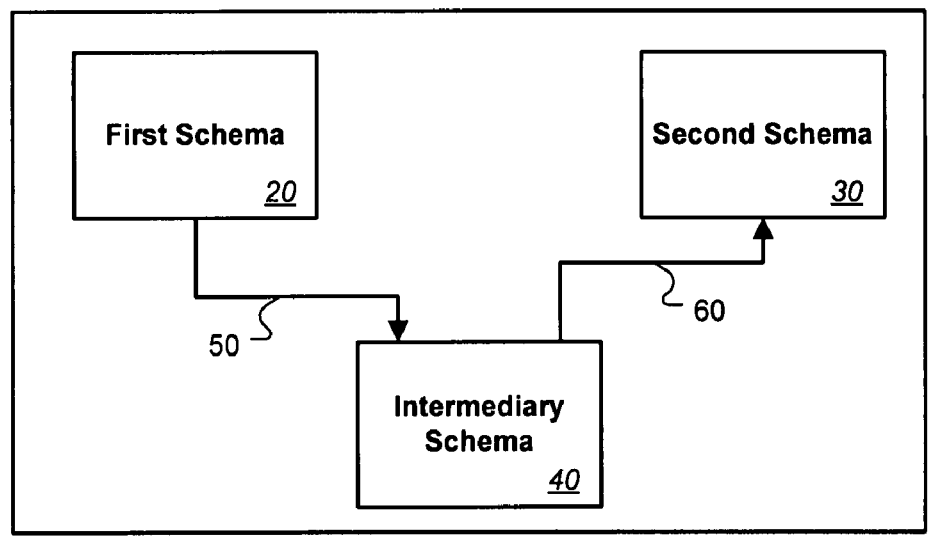
FIG. 1 schematically illustrates translation from a first schema to a second schema.

FIG. 1 shows a computer system 10 that includes at least a first schema 20 and a second schema 30. Documents created according to the first schema 20 have a first schema format and documents created according to the second schema 30 have a second schema format. The first and second schemas 20, 30 are different, meaning that a computer that is configured to understand only documents of the first schema format will not understand a document having the second schema format. However, a translation of the document can be provided through one or more mappings. Below will be described examples how such mapping(s) can be created using a content value and a generated name for a schema node.

Particularly, the system 10 may be provided with one intermediary schema 40 that is not identical to either of the first and second schemas 20, 30. The intermediary schema 40 may be based on the conventions of UN/CEFACT XML Naming and Design Rules for CCTS or could be represented in other technical formats while being based on CCTS conventions (e.g., F-Logic representation, relational database scheme (SQL), etc.). Moreover, there can be created a first mapping 50 from the first schema 20 to the intermediary schema 40. To the extent possible, the first mapping 50 maps portions of the first schema 20 to corresponding portions of the intermediary schema 40. Each portion describes an entity of a semantic meaning that belongs together. A second mapping 60 can then be used to map the translated portions from the intermediary schema 40 to the second schema 30. While single first and second schemas are shown here for simplicity, other configurations are possible. Particularly, there can be more than one first schema and/or more than one second schema. For example, an n:m mapping and conversion can be used, where n is the number of schemas being mapped from and m is the number of schemas mapped to, such as with an CCTS-based intermediate format.

In some examples, the system 10 can use one or more matching procedures to create a mapping from the first schema 20 to the second schema 30. The matching procedures may be processed by a hybrid matcher and/or a combined matcher. For example, the hybrid matcher creates the mappings 50, 60 using one or more match criteria or information sources. In some embodiments, the hybrid matcher can create the mappings 50, 60 by considering the criteria in a particular order according to specific heuristics. For example, the system 10 may be mapping a data type element of the first scheme 20. A hybrid matcher may check the similarity of the data type element of the first schema 20 to a plurality of data type elements of the intermediary schema 40 in a specific order. In one example, the hybrid matcher may have a specific order in applying several matcher components. In one example, the system 10 may first use a data type matcher for matching the data types between the first schema 20 and the intermediary schema 40. Later, the system 10 may use a name matcher for checking similarity of the data type names between the first schema 20 and the intermediary schema 40. The heuristics may be predefined in the hybrid matcher. This can provide better time performance compared to separate execution of multiple matchers by reducing the number of passes to be performed over the input schema(s). As another example, the hybrid matcher can effectively and promptly identify poor match candidates by qualifying the match candidates using more than one matching criteria.

The combined matchers can use multiple matchers, which can be either hybrid matchers, combined matchers, or both, to name a few examples. The combined matchers can be used to estimate element similarity between schemas. The approach for combining the results of constituent matchers in a combined matcher can follow the same or similar principles as used for combining matcher results in a final phase of a match iteration. Examples of matchers and matching approaches include, but are not limited to:

---

Data Type Matching
Name Matching
Name/Structure Similarity Matching
Structure/Level Path Matching
Children/Parents Matching
Code and Qualifier Matching
Definition/Comment Matching
Synonym/Homonym (Linguistic) Matching
Dictionary Entry Name Matching
Context Matching

---

Other examples are described below with reference to FIG. 4.

In one embodiment, the intermediate schema 40 may use dictionary entry names (DENs) defined by the standard UN/CEFACT CCTS. For example, the system 10 may obtain a definition related to the first schema 20 and generate a DEN for the obtained definition via the first mapping 50. Using the generated DEN, the system 10 can use the second mapping 60 to map the DEN to the second schema 30.

It is possible, however, that one or more portions of the first schema 20 cannot be mapped to the intermediary schema 40 by the different matchers of the hybrid mapping approach. The first schema 20 may include a portion that has no corresponding portion in the intermediary schema 40. For example, the intermediary schema 40 may lack a building block corresponding to a "buyer's agent". In such and other situations, an approach that is followed can run essentially as follows:

1.) The system can first categorize the portions of the first scheme 20 with their respective context values according to predefined context categories.

2.) The system can then generate DENs for the portions of the first scheme 20.

3.) The system can then attempt to match the portions of the first scheme 20 with the intermediary scheme 40 by using the hybrid matching approach. The system can consider the information of portions of other schemas that are already mapped to the appropriate portions of the intermediary schema, by using the same hybrid matching approach. An example of this is the appropriate portion of the second schema 30 if this schema is already mapped with the intermediary schema 40. This can increase the quality of matching, because the additional comparison with the already mapped schemes can increase the precision at a semantic and context specific level.

4.) The system can then map the corresponding nodes of the first scheme 20 to the intermediary scheme 40.

5.) For any of the portions that cannot be mapped, the system can generate a new entry at the appropriate position of the intermediary scheme 40 according the rules that apply to the intermediary format, such as CCTS. The DEN for the new entry can be the already generated DEN for the first scheme 20.

6.) The system can also place the appropriate portion of the first schema 20 beneath the newly generated entry in the intermediary scheme 40.

7.) The system can suggest the new DEN to the user.

In some embodiments, the system 10 generates a new entry corresponding to the lacking building block at the appropriate position of the intermediary schema 40 according the rules of CCTS. For example, the new entry may have a DEN that is the generated DEN for the first scheme 20. In some examples, the system 10 can insert the appropriate portion of first scheme 20 beneath the new entry in the intermediary scheme 40. The system 10 can suggest the new DEN to the user. If the user accepts the suggestion, the system 10 can then map the first schema 20 to the intermediary schema using the new entry.

In some embodiments, the system 10 can use context values in creating the mappings 50, 60, for example as follows. For example, the term "bank" may be ambiguous unless the precise context where it will be used is known. The system 10 may therefore identify at least one context category defined for the first schema 20 and the second schema 30 in generating the mapping 50 and the mapping 60, respectively. In some examples, the system 10 can use the at least one context category of the first and second schemas 20, 30 to reduce computation time and complexity for generating the mappings 50, 60, respectively.

In operation, the system 10 can generate the mappings 50, 60 to map portions between the first schema 20 and the second schema 30 using one or more appropriate portions of the intermediary schema 40. In some embodiments, the system 10 can use the mappings 50, 60 to automatically generate conversion rules. Such rules can be used at runtime for converting incoming instances in one schema into outgoing instance of another schema. For example, the system 10 can use the conversion rules at runtime to convert instances in the first schema 20 into an instance in the second schema 30. In so doing, directions can be considered separately. For example, in FIG. 1 six conversion rules can be identified and/or generated:

From the first schema 20 to the second schema 30

From the first schema 20 to the intermediary schema 40

From the second schema 30 to the first schema 20

From the second schema 30 to the intermediary schema 40

From the intermediary schema 40 to first the schema 20

From the intermediary schema 40 to the second schema 30

Such conversion rules can convert instances that are based on the first schema, the second schema and also the intermediary schema at runtime. In other implementations, other conversion rules can be used.

Figure 2:
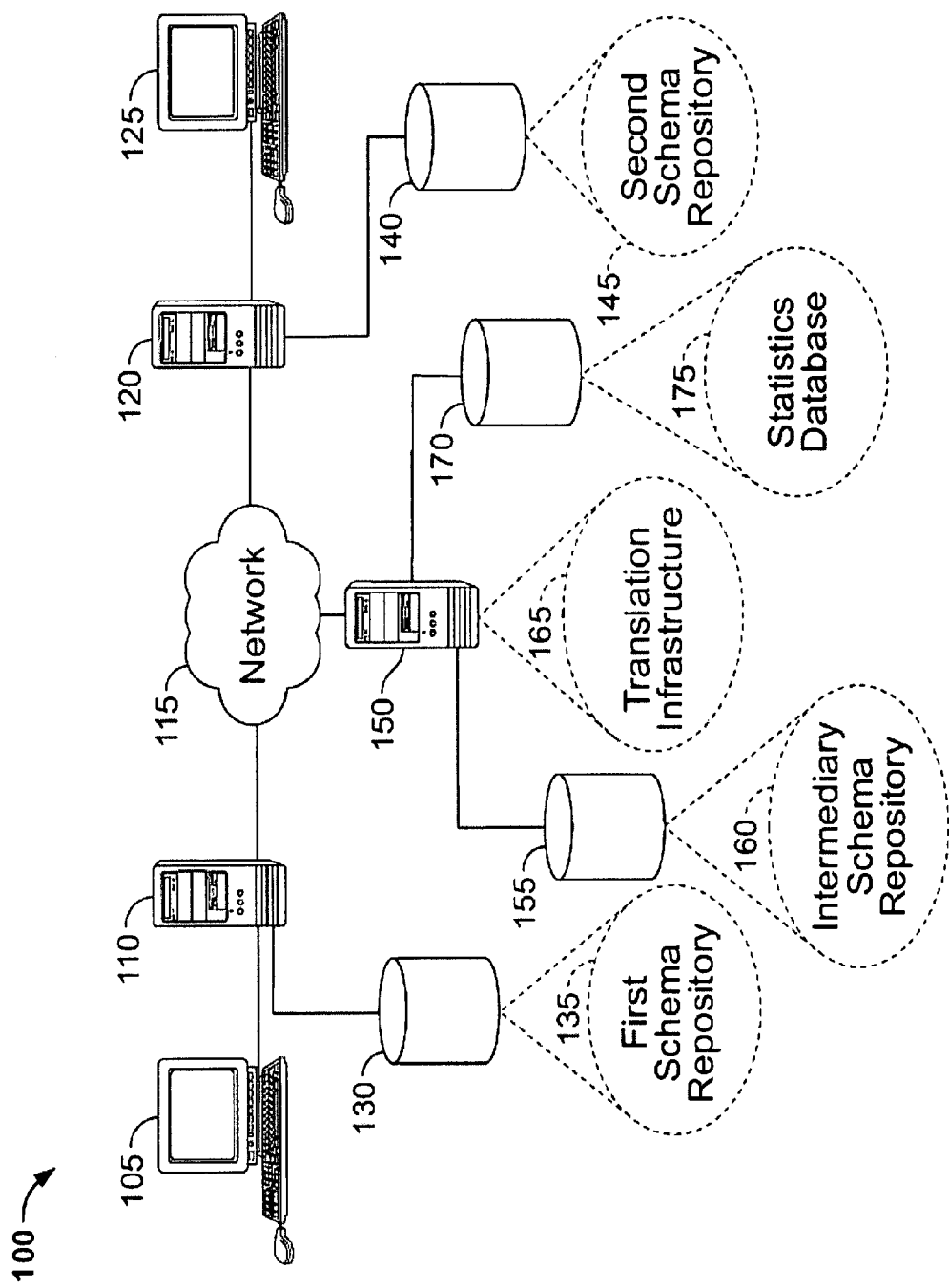
FIG. 2 shows a computer system that can translate between schemas.

FIG. 2 is a block diagram of a system 100 for transacting electronic business using schemas. Particularly, the system 100 can translate documents from a first schema format to a second schema format using one or more mappings. The system 100 includes a first monitor 105 connected to a first computer 110 and a second monitor 125 connected to a second computer 120. Electronic business communications between the first computer 110 and the second computer 120 are conducted over a network 115, such as the Internet, in accordance with a business communication schema. To facilitate electronic business communications, the first computer 110 includes a data storage device 130 containing a first schema repository 135 and the second computer 120 includes a data storage device 140 containing a second schema repository 145. Each of the first schema repository 135 and the second schema repository 145 store metadata describing one or more formats defined by a business communication schema.

Particularly, the first schema repository 135 can store the first schema 20 and uses it in creating and interpreting business documents. In particular, the first computer 110 organizes the data entered by the user according to a communication schema format, and can then transmit the document over the network 115 to a receiving entity, such as the second computer 120. The second computer 120 is capable of interpreting received electronic documents in accordance with the metadata stored in the second schema repository 145. Particularly, the second schema repository 145 can store the second schema 30 and uses it in creating and interpreting business documents.

An intermediary computer 150 is connected to the network 115 and includes a translation infrastructure 165 for translating the electronic document from the first schema format to the second schema format. The intermediary computer 150 includes a storage device 155 containing an intermediary schema repository 160. The intermediary schema repository 160 can include the first mapping 50 and the second mapping 60, to name just two examples. Accordingly, the intermediary computer 150 can translate the document using the mapping over the intermediary schema. For example, the translation infrastructure 165 can include the Exchange Infrastructure available from SAP AG of Walldorf (Baden), Germany. In some examples, the translation infrastructure 165 can include naming rules defined for generating DENs.

A storage device 170 may contain a statistics database 175 that is used in collecting various data regarding the operation of the intermediary computer or the translation infrastructure 165. Particularly, the data obtained in monitoring use of the direct mapping may be deposited in the storage device 170. Regularly, or from time to time, the intermediary computer 150 can analyze the database 175 and determine whether the use meets the predefined criterion. The predefined criterion may correspond to how many times the direct mapping has been used, or how frequently it has been used, to name two examples. The same criteria may be used for several direct mappings. Further examples of mappings are described in pending patent application Ser. No. 11/088,158, entitled "Translation of Information Between Schemas", the contents of which are incorporated herein by reference.

Figure 3:
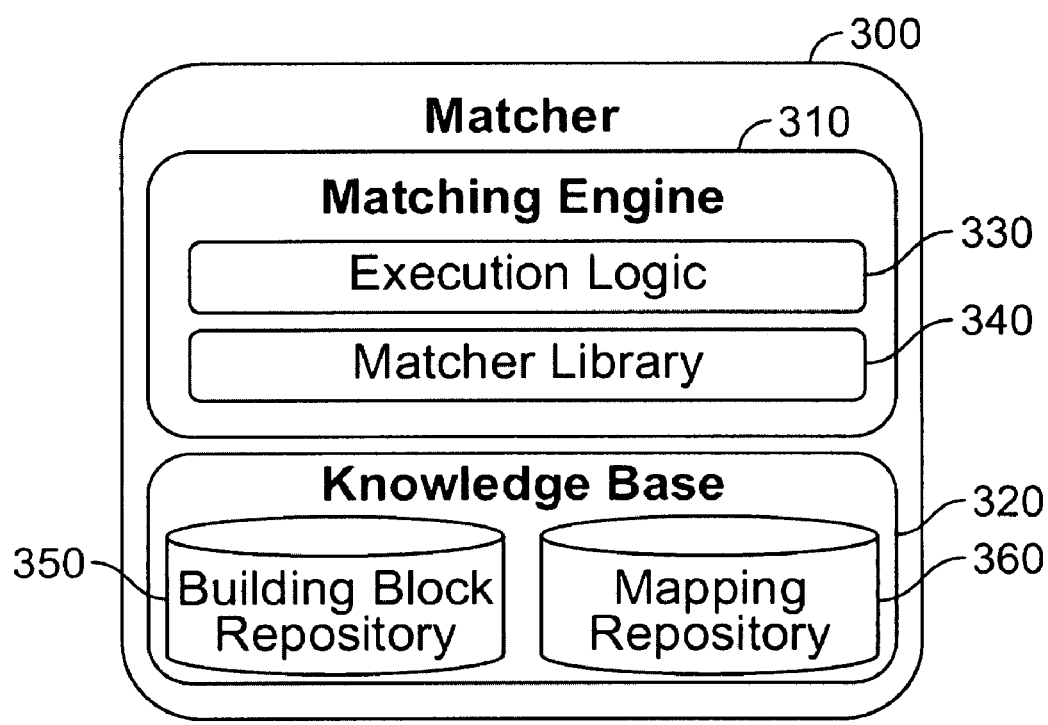
FIG. 3 shows a matcher module that can create mappings.

The mappings used in the translation may be created using one or more matching procedures. FIG. 3 shows a matcher module 300 that can perform such a procedure. For example, the matcher module 300 can be included in the intermediary computer 150. The matcher module 300 includes a matching engine 310 that performs the procedure(s) and a knowledge base 320 that holds relevant information. The matching engine 310 includes execution logic 330 and a matcher library 340. The knowledge base 320 includes a building block repository 350 that includes the building blocks that make up the intermediary schema. For example, when the intermediary schema is CCTS-based, the building block repository includes building blocks defined by CCTS. The knowledge base 320 also includes a mapping repository 360 in which can be stored one or more mappings between a schema and an intermediary schema.

Figure 4:
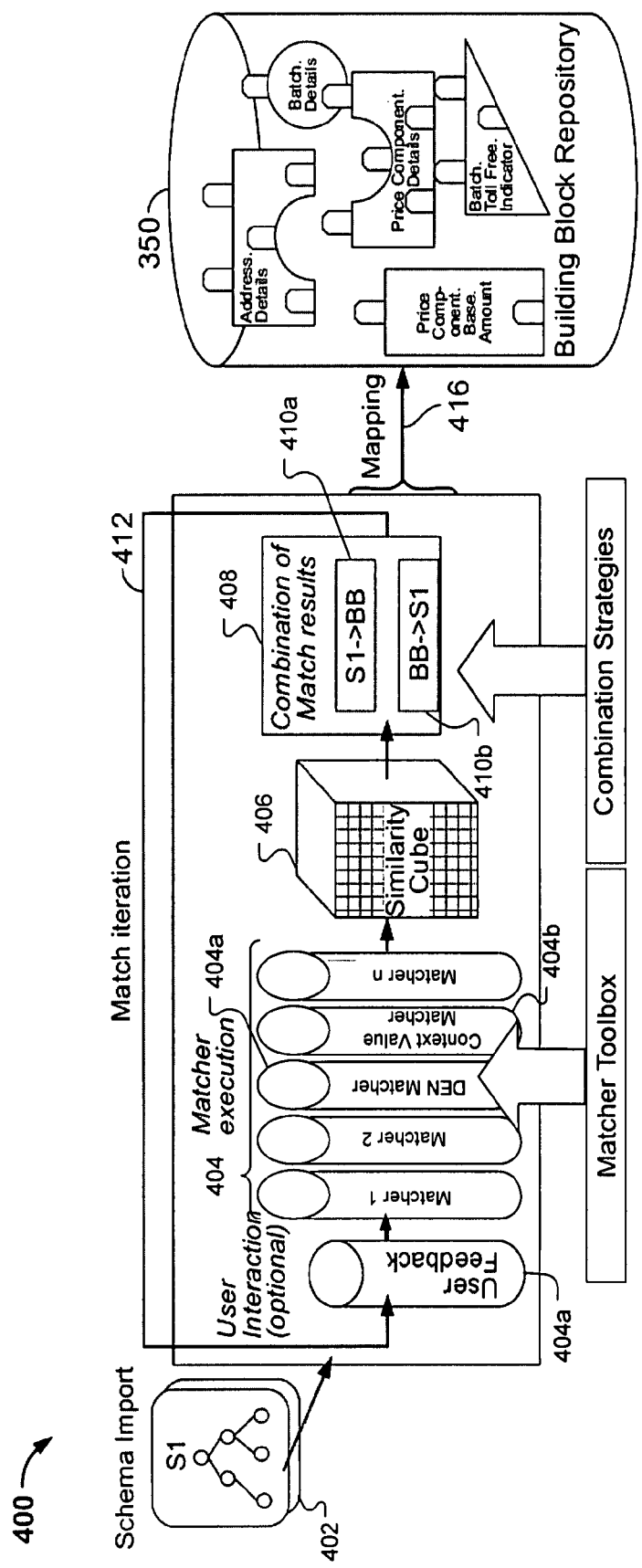
FIG. 4 schematically illustrates creation of a mapping from a first schema to an intermediary schema.

FIG. 4 schematically shows a procedure 400 that exemplifies how the first mapping 50 from the first schema 20 to the intermediary schema 40 can be created. In some embodiments, the system 10 can perform one or more pre-conditioning procedures to generate an imported schema 402 from the first schema 20. Steps that precede the procedure 400 can include context value assignment and transformation into a standards-based convention. Such steps can include:

1.) Defining and assigning the context(s) in which this schema and its entities are valid. For example, the context values may indicate a primary usage of the first schema (e.g., Industry="High Tech"; Business Process="Purchasing"; Geopolitical="Global"). This can be considered a contextualization and can be done by the user before a matching and normalization into CCTS format. A contextualization can provide a higher precision for subsequent processes. For example, semantic aspects can be ambiguous and can limit DEN naming and matching results. Examples relating to context value assignment are described below with regard to FIG. 5.

2.) Transforming entities of a schema into a CCTS-based schema. For example, the imported schema 402 can be transformed to include DENs representation of the nodes in the first schema 20. CCTS normalization can improve the mapping results, and if an appropriate entity in the intermediary scheme does not exist, the specific entity of the external schema can be directly integrated into the intermediary schema as a new node with a new semantics. Examples relating to transforming schema entities into the CCTS convention are described below with reference to FIG. 9.

Returning now to FIG. 4, the matching procedure 400 includes an imported schema 402 that is related to the first schema 20. The matching module 400 is used to apply one or more matching procedures to the first schema 20, as indicated by respective matcher components 404 labeled Matcher 1, Matcher 2, . . . , Matcher n. The input to the procedure 400 in this example is the schema 402, and in other implementations can be another definition that relates to a schema, such as a mapping between two or more schemas, to name just one example.

In another example, the imported schema 402 may include nodes of the first schema 20 transformed into CCTS conventions. By transforming the entities of the first schema 20 into CCTS conventions, the procedure 400 may generate more accurate results. Additionally, if an appropriate entity in the intermediary schema 40 corresponding to a specific entity of the first schema 20 does not exist, the specific entity can be directly integrated into the intermediary schema 40 as a new node with a new semantics because the specific entity is already transformed into CCTS conventions. Some examples of generating dictionary entry names (DENs) of entities of the first schema 20 are described with reference to FIG. 6. As shown in this example, the matcher components 404 include a DEN matcher 404a and a context value matcher 404b. The procedure 400 includes execution of the DEN matcher 404a to match for the DENs of each of the nodes in the imported schema 402 and DENs of some or all of the nodes in the intermediary schema, such as by comparing with the DENs of the target nodes.

The context value matcher 404b matches the context value of each node of the imported schema 402 with the context value of a node of the intermediate schema. The context value matcher 404b compares the context values of the nodes of the imported schema 402 with the context values of the nodes in the intermediary schema. Based on the comparison result, the context value matcher 404b can assign probability values to the matching candidates. For example, the context value matcher 404b can assign a higher probability value to a matching candidate that has a similar set of context values as the set of context values assigned to the imported schema 402. The probability values can be combined later in the procedure 400 to generate a score for ranking the match candidates. If the result is sufficiently unambiguous (according to a predefined criterion), the final mapping to the appropriate node can be created.

The matching procedure may be analogized to a toolbox where different tools (matching procedures) are sequentially applied to the schema to find a suitable match within the intermediary schema. The procedure 400 may use the DEN matcher 404a, the context value matcher 404b, and possibly one or more conventional and adaptive (heuristic) matching procedures in creating the mapping(s). For example, the procedure 400 may also use the hybrid matchers and the combine matchers. More simple matching procedures involve the use of a synonym library to compare leaf names in the first schema and the intermediary schema, or a node-by-node comparison of tree structures in the respective schemas. The procedure may analyze the type of the schema component that is to be mapped. Matching procedures may use a hybrid approach that also considers a set of criteria in a particular order according to some specific heuristics. The results of the matching procedure(s) may consist of probabilities associated with possible candidate building blocks in the intermediary schema.

Each matching algorithm can calculate a probability that any element X of the source schema maps to an element Y of the intermediary schema. In one example, the DEN matcher 404a may assign a high probability to an element Y of the intermediary schema to match an element X in the source schema if the DEN of the element Y matches the DEN of the element X. In another example, the context value matcher 404b can assign a higher probability to the element Y to match the element X if the element Y has the same context value as the element X. For example, the matcher components 404 may identify two results to translate the term "bank". The first result may have a context value indicating that it is used in the financial industry, and the second result may have a context value indicating that it is used in the gardening industry. Depending on the context value of the source schema, the context value matcher 404b can adjust the probability of the two results. Suppose the source schema has a context value of a gardening industry, then the context value matcher 404b may assign a higher probability to the second result.

In some implementations, the context matcher 404b may determine a probability value for each of the matching candidates based on a set of context logic. For example, the context matcher 404b may include a context logic processor to analyze the context values of the matching candidates and the input schema. The context logic processor may determine that the matching candidate having similar context values as the input schema may be assigned a higher probability. In some embodiments, the context categories can have different weights for calculation of matching probabilities. For example, the context category industry (IN) may have a higher weight than the context category business process (Bu).

As an illustrative example, the input schema node may be associated with a context In=(MA) and Bu=(OR), where MA represents manufacturing and OR represents order processing.

Suppose there are three matching candidates from the intermediary schema. For example, a first node that is a matching candidate includes the context In=(*), Bu=(OR), where "*" is a wildcard character. A second node that is a matching candidate includes the context In=(MA), Bu=(OR,IN), where IN represents invoice processing. Finally, in this example, a third node that is a matching candidates includes the context In=(MA,AU), Bu=(OR), where AU represents the automotive industry. Based on weights of the context categories, the context matcher 404b may assign the highest probability to the second matching candidate because the wildcard character in node 1 relates to a bigger set than a single value, and the category In has a higher weight than the category Bu.

In another example, if context values do not match but DEN correspondence is high, the matching procedure 400 can recommend that the existing schema be extended for the new context value(s). If n number of matching algorithms are available and if the source schema has s number of elements and the intermediary schema has i number of elements, a total of n*s*i probability values will be calculated. The probability values from each of the matching components 404 may be represented as a similarity cube 406 having edges that correspond, respectively, to n, s and i values. The n probability values created by the n matchers of the element X corresponding to the element Y can then be combined into a final probability value using weights. A threshold value may be used to determine if the resulting probability for the mapping is sufficiently high. The results are combined into a matching result at a combination stage 408. The matching result may include a "S1->BB" mapping 410a, corresponding to the mapping from the first schema to the building blocks in the intermediary schema. Similarly, the result may include a "BB->S1" mapping 410b, corresponding to the reverse mapping, from the intermediary building block(s) to the first schema. The latter mapping can be used in translations to the first schema from other schemas, including the second schema.

Various combination strategies can be used to combine the probability values generated by each of the matcher components 404. In one example, the combination stage 408 may include a weighting function to combine the results from the matchers 404. For example, the combination stage 408 may combine the probability values using a linear combination of the weights and the probability values. The procedure 400 can assign different weights to the matcher components 404. In one embodiment, the DEN matcher 404a may have the highest weight and the context value matcher 404b may have the second highest weight. Examples of weights of the meta model information and association to the matcher components 404 are listed in the following table:

TABLE 1

| Rank | Matcher Component | Matcher | Weight |
|---|---|---|---|
| 1 | Association | Structure/Level Path Matching Name/Structure Similarity Matching | 1 |
| 2 | Position | | 2 |
| 3 | controllingAgency | Name Matching | 4 |
| 4 | standardVersion | Name Matching | 8 |
| 5 | standardID | Name Matching | 16 |
| 6 | dataType | Data Type Matching | 32 |
| 7 | syntaxVersion | Name Matching | 64 |
| 8 | release | Name Matching | 128 |
| 9 | version | Name Matching | 256 |
| 10 | unitBusinessCategory | Name Matching | 512 |
| 11 | idOrganizationalUnit | Name Matching | 1024 |
| 12 | businessCategory | Name Matching | 2048 |
| 13 | idOrganization | Name Matching | 4096 |
| 14 | businessDocument | Name Matching | 8192 |
| 15 | direction | Name Matching | 16384 |
| 16 | standard | Name Matching | 32768 |
| 17 | context | Context Matching | 65536 |
| 18 | entityName | Name Matching | 131072 |
| 19 | dictionaryEntryName | DEN Matching/Synonym Matching | 262144 |
| 20 | qualifier values | Code and Qualifier Matching | 524288 |
| 21 | code values | Code and Qualifier Matching | 1048576 |

Table 1 shows that a matching of the matcher component "controllingAgency" has a weight value of 4, whereas the context matcher component has a weight value of 65536, to name two examples. Table 1 also shows that each matcher component, which can be an attribute of the meta model, can be associated with a respective matcher that operates according to a particular matching approach. For example, the matcher component "controllingAgency" is associated with the Name Matching matcher, and the context matcher component is associated with the Context Matching component. Using the listed weight(s), the aspects covered by the respective matchers listed in Table 1 will be given relatively high or low significance in determining the mapping.

In some implementations, the matching result is based on the following formula:

$$T = \begin{cases} 0, \exists i \in [1, \ldots n]:t_i = -1 \\ \sum_{i=1}^{n} t_i \cdot 2^{i-1}, \text{ otherwise} \end{cases} \quad (*)$$

To describe the formula in more detail, we introduce the following terms:

We define $A_1, \ldots, A_n$ as the content of n filter data structure attributes (FilterDSA). The FilterDSA can be used to do a filtered matching, which can improve performance. Consider that it may make little or no sense to compare an entity of the first schema (20) with all entities of the intermediary schema (40). For this and/or other reasons, one or more aspects (including, but not limited to, context, type of standard, kind of entity (such as leaf elements, associations or types), level of hierarchies etc.) can be used to set or create a filter, here implemented by the FilterDSA. This means the system can match with the entities that are filtered. In some implementations, the filter could be the context, such as industry "Manufacturing". In such a situation, the system will do a match with the entities that are associated with the context industry "Manufacturing". If no sufficient (unambiguous) result is obtained, the system can revise the filter by taking out one or more filter attributes, and can perform a next iteration of matching. This procedure can be repeated until the result is either unambiguous or only an ambiguous or non-matchable result remains after all filter attributes have been removed.

We define $a_1, \ldots, a_n$ as the content of the n attributes of the typeElement (e.g., a node) to be tested, for which the test entity T is to be calculated.

The selection of the proper typeElements according to a FilterDSA can then be performed in three steps:

A first step can include comparing every $A_i$ with the corresponding $a_i$, and for each one that satisfies the test, assign the predetermined number of points (e.g., the weight numbers listed in Table 1 above). The assigned points form a partial test value $t_i$, that reflects the result of comparing two attributes.

A second step can include calculating the actual test entity T using the partial test values $t_1, \ldots, t_n$. The test entity specifies how many points the typeElement has totally received in the comparison of attributes.

In a third and, in this example, last, step only the maximum $T_{max}$ of all test entities T for a single typeElement is forwarded. All of the typeElements that have lower values than $T_{max}$, or whose value falls below a required minimum value $T_{min}$, can be discarded or rejected.

Two attribute values A and a can be considered compatible with each other (symbolized by A≅a) when the relation $$A = a$$

holds, or when $A \neq a$ and there exists a context within which the attribute values can be said to be semantically similar. Consider the examples:

$$A=\text{"INOUT"}, a=\text{"IN"}$$

and $$A=\text{"IN"}, a=\text{"INOUT"},$$

respectively. In the former example, there is sought typeElements defined for both the incoming and the outgoing directions, hence the term "INOUT". A typeElement that is defined for the incoming direction, represented by the term "IN", can then be considered relevant.

In the latter example, there is sought typeElements defined for the incoming direction, hence the term "IN". A typeElement defined for both directions, represented by the term "INOUT", can then be considered relevant.

The partial test entities $t_i$ can be determined as follows:

$$t_i = \begin{cases} 1, & a_i \sim A_i \wedge a_i \neq \varepsilon \\ 0, & a_i = \varepsilon \\ -1, & a_i \nsim A_i \wedge a_i \neq \varepsilon \end{cases}$$

The following are notes on determining the partial test entities $t_i$. The value 1 is assigned when the corresponding attribute in the typeElement is set (and also is not the empty string), and when the attribute from the FilterDSA is compatible with the typeElement. However, if the attribute in the typeElement not set (or if it is the empty string), then no statement can be made. A neutral value of zero can then be assigned. On the other hand, when the typeElement is set (and also is not the empty string) and not compatible with the attribute from the FilterDSA, then the typeElement(s) will not be available for selection. This can be recorded using a value of −1.

The test entity T can then be determined using the following formula, per the above:

$$T = \begin{cases} 0, & \exists i \in [1, \ldots, n]: t_i = -1 \\ \sum_{i=1}^{n} t_i \cdot 2^{i-1}, & \text{otherwise} \end{cases}$$

That is, the result T equals zero if any of the matcher generates a matching value of −1. Otherwise, T equals to the sum of each of the generated matching value multiplied by the weight of the matcher. The weights are expressed here as $2^{i-1}$, where i is the rank of the matcher. The weights of individual attributes can be any or all of those described with reference to Table 1 above, for example.

Each entity of standard that is to be matched can be compared with a CCTS-based entity. Some different matchers (e.g., those listed in Table 1) for the comparison and the following result can be calculated.

"1" means the matching is correct, and the value is not empty.

"0" means the value is empty, which leads to no predicate.

"−1" means the matching is not correct, and the value is not empty.

Using the above formula, the product of all matching calculations gives the matching result. However, the matching result will be automatically 0 if one of the matching entries has "−1", according to the above formula.

All remaining matches can be calculated by the number of estimated weights:

$$T_{max} = \max_{i \in [1, \ldots, m]} \{T_i\}$$

whereby I=21 in this example because we have 21 identified comparison parts.

The algorithm for these remaining matches can be based on the following formula:

$$T_{DSA} = \{i \in [1, \ldots, m] | T_i > T_{min} \wedge T_i = T_{max}\}$$

An example result can be expressed using a table such as the following:

TABLE 2

| Standard | P(i) | Version | P(i) | ... | Context | P(i) | DEN | P(i) | Product |
|---|---|---|---|---|---|---|---|---|---|
| Input | | | | | | | | | |
| EDIFACT | | D | | ... | Geopolitical = "USA" | | Buyer. Address | | |
| Results | | | | | | | | | |
| EDIFACT | 32768 | D | 256 | ... | Geopolitical = "Germany" | −1 | Buyer. Address | 131072 | 0 |
| EDIFACT | 32768 | D | 256 | ... | | 0 | | 0 | 33024 |
| IBU | −1 | FREETEXT | −1 | ... | Geopolitical = "USA" | 65536 | Buyer. Address | 131072 | 0 |
| EDIFACT | 32768 | D | 256 | ... | Geopolitical = "USA" | 65536 | Buyer. Address | 131072 | 170652 |

P(i) here represents the weights. For example, the input is a received node in the procedure 400, and the four results are candidates for mapping the input into the intermediate schema identified by the matcher components 404. Here, the input has a standard of "EDIFACT", a version of "D", and a geopolitical context value of "USA", and a DEN of "Buyer. Address". Depending on the attributes of the matching results, the matcher components 404 assign different weights to the results. If a matcher determines that a matching is correct, then the matcher can assign a weight to the result according to Table 1. In this example, the standard matcher assigns a weight of 32768 to the results having a standard of "EDIFACT" because the standard of the input is "EDIFACT". If a matcher determines that a matching is not correct, the matcher assigns a weight of −1 to the result. In this example, the version matcher assign a weight of −1 to a result having a version of "FREETEXT" because the version of the input is "D". If a matcher determines that a matching is empty, the matcher assigns a weight of 0 to the result. In this example, the DEN matcher assign a weight of zero to the result having an empty DEN.

Based on the assigned weights, a product value can be computed for each of the results using the formula (*). If a matching result includes at least one incorrect matching, then the result is determined to have a product of zero. For example, the first result has a product value of zero because the context value of the result (Geopolitical="Germany") and the context value of the input (Geopolitical="USA") does not match. In another example, the third result has a product value of zero because the standard and the version of the result do not match the standard and the version of the input.

If none of the matching is not correct, then a product value is computed by summing all the weights assigned to the result. In this example, the second result having a standard of "EDIFACT", a version of "D", and no context value and DEN is computed to have a product value of 33024. The forth result having a standard of "EDIFACT", a version of "D", and a geopolitical context value of "USA", and a DEN of "Buyer. Address" is computed to have a product value of 170652.

If any of the matching is not correct, then a new DEN may be integrated into the intermediary schema. In one example, the new DEN may be shown as a recommendation of a new entity to the user. The user can accept this recommendation or map the unmappable portion of the input schema manually to the appropriate intermediate scheme entities according to the user's requirements, to name two examples.

The procedure 400 can compare the product values to determine the best match for the input. In this example, the procedure 400 selects the last result because it has the highest product value.

After the detailed calculations, and the product values are evaluated, there can be generated a final statement characterizing the matching as an ambiguous match, an unambiguous match, or even as non-matching. Thus, this can be the result in the combination stage 408.

The matching procedure 400 may, however, not end with the first formulation of a result in the combination stage 408. Rather, the procedure 400 may go through one or more iterations 412, in which the current results are tested against the respective schemas and re-evaluated for accuracy and robustness. Particularly, portions that have been found unmappable may be retried in light of the overall result. The procedure 400 may allow user feedback 414 for portions that the matcher module 300 has not successfully mapped. Nevertheless, some first-schema portions may be deemed unmappable after several iterations. For such portions, the matcher module 300 can generate a new entry in the intermediary schema to matching these unmappable portions. For example, the procedure 400 can add a new entry in the intermediary schema using the DEN of the first-schema portion.

In some embodiments, the weights used by the combination stage 408 can be adjusted in an attempt to produce more desirable results after each iterations 410. For example, the combination stage 408 may determine that there are ambiguous mappings between the imported schema and the intermediary schema. Based on determination result, the combination stage can revise the weight of at least one matcher component. Thus, the ratio of the weight of the at least one matcher component to the weights of the other matcher components 404 is changed. In a subsequent iteration, the combination stage 408 can then use the weights as revised to generate the matching result. Further examples of weight adjustments are described in pending patent application Ser. No. 10/856,694, entitled "Automatic Match Tuning", the contents of which are incorporated herein by reference.

After obtaining a final matching result, the procedure 400 can receive user feedback by allowing the user to accept or reject the final matching result. For example, the procedure 400 may present the final matching result as a suggestion to the user. Upon presenting the suggestion, the procedure 400 can receive a user input indicating an acceptance or a rejection of the suggestion. If the user rejects the suggestion, then the procedure 400 may, for example, request more information from the user and perform another iteration of the matching procedure to obtain another matching result. If the user accepts the suggestion, then the final matching result may be exported and stored in the building block repository 350. In some embodiments, the matching procedure 400 can add the received context values to the final matching result upon receiving the acceptance from the user.

From the final results of the matching procedure the system forms a mapping from the first schema to the intermediary schema, with the possible exception of the unmappable portion(s). Particularly, the mapping provides the relation between the first schema and the building blocks of the intermediary schema, as schematically illustrated by an arrow 416. Examples of such building blocks in the building block repository are "Address. Details," Batch. Details," Price Component. Details," "Price Component. Base. Amount" and "Batch. Toll Free. Indicator," the names of which indicate their respective functions. The matcher module stores the created mapping in the mapping repository 360.

Figure 5:
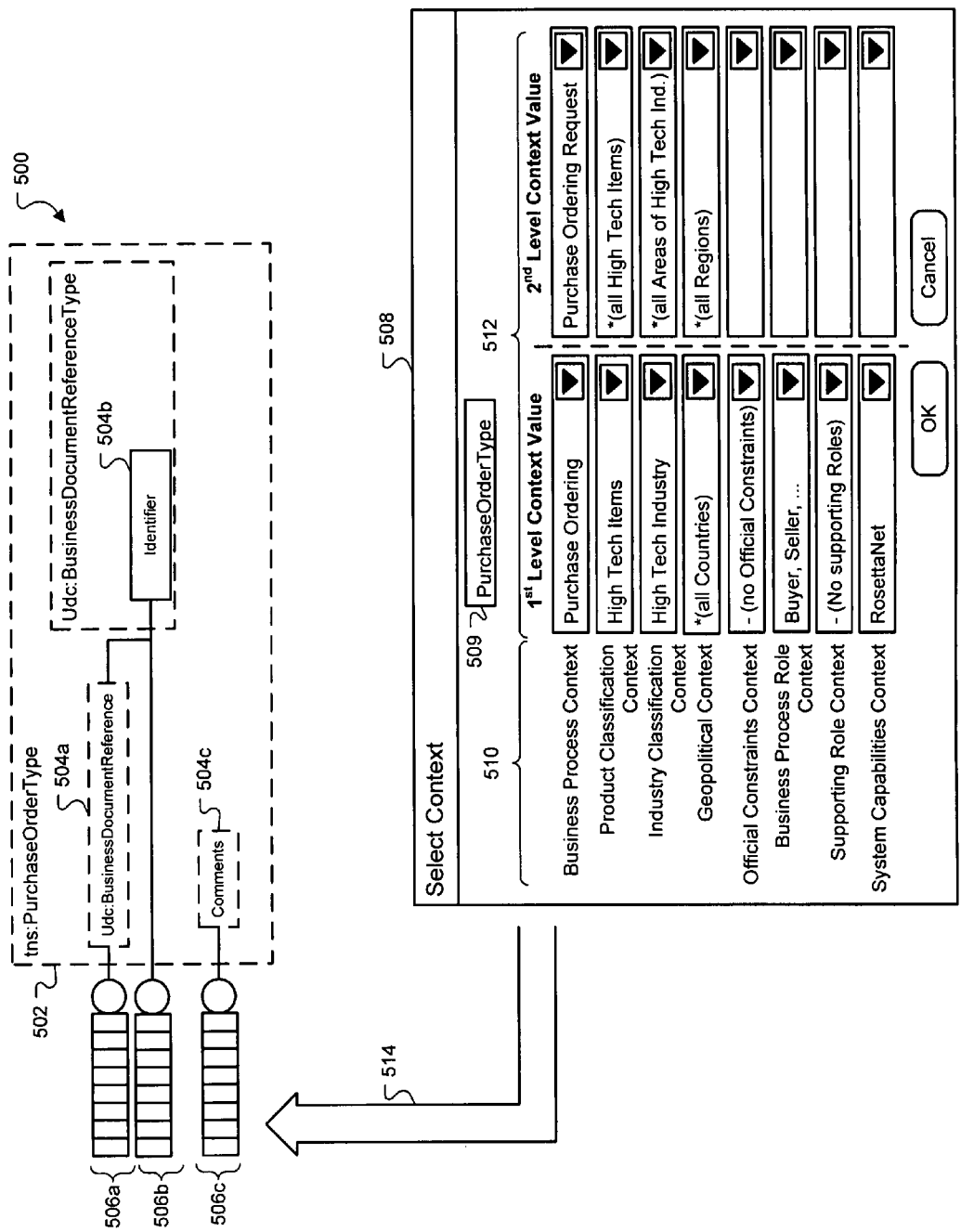
FIG. 5 schematically shows a process for defining context in a schema.

FIG. 5 schematically shows an exemplary process 500 for defining a context for a schema 502. As noted above, the schema 502 can be one that is to be received as an input to the matching procedure 400. Thus, after the context of the schema 502 has been defined, the schema 502 can be imported to the matching procedure 400 to be mapped into the intermediary schema format.

As shown, the schema 502 includes a plurality of nodes 504a, 504b, 504c. Any or all of the nodes 504a-c is to be associated with a context value set 506a, 506b, 506c as a result of the process 500. Note that FIG. 5 in this example only shows a portion of a full schema for clarity.

The process 500 includes a graphical user interface (GUI) 508 to set the context values for any or all of the nodes 504a-c. In one embodiment, a user can use the GUI 508 to enter a context value to be associated with the schema 502 (e.g., a definition in the schema 502) in its entirely. That is, the entered context value(s) can be associated with all entities of the schema 502. In one embodiment, the GUI 508 may be generated when a user inputs an entry to identify a definition related to the schema 502 in a previous GUI. For example, the user may browse to a file location where the schema 502 is stored and initiate the entry of context value(s). In the implementation shown here, the GUI 508 includes an input area 509 where the user can enter the name of a schema or a mapping so as to direct the entered context value(s) for association with that schema/mapping.

As shown, the GUI 508 includes multiple context categories 510. For each of the context categories 510, the GUI 508 includes one or more drop-down list boxes 512 for the user to select a context value. In one embodiment, the context categories 510 and the values included in the drop-down list boxes 512 are identified based on CCTS defined context categories and context values. Each of the context categories 510 may include a default context value that may be set when the GUI 508 is generated.

In this example, a user can enter the context value for the schema 502 in any or all of the context categories 510 using the GUI 508. Multiple levels of context value are presented. The user can first select a context value in the drop-down list box containing the first level context values and then further select a second level context value within the first level context. For example, the user can select "Purchasing Ordering Request" as the context value for the "Business Process Context" category by first selecting "Purchasing Ordering" in the first level and "Purchase Ordering Request" in the second level. The user can also select a wildcard context value ("*"). For example, the user enters the wildcard context value in a "Geopolitical Context" category, meaning the contexts of the nodes in the schema 502 are not restricted to any country.

In one embodiment, the GUI 508 is presented to the user when context information is required. For example, the matching procedure 400 may cause the GUI 508 to be presented before starting the matching or in a first iteration thereof.

The user can cause the entered context value(s) to be assigned to the current schema, as indicated by an arrow 514, by selecting an "OK" button in the GUI 508. In one example, the user can use the GUI 508 to define the context values 506a-c of the schema 502. Next, the user can cause the schema 502 to be imported for matching. By taking the context values 506a-c and the names into account, the procedure 400 can generate a mapping of the nodes 504a-c to a respective one of the nodes in the intermediate schema.

Figure 6:
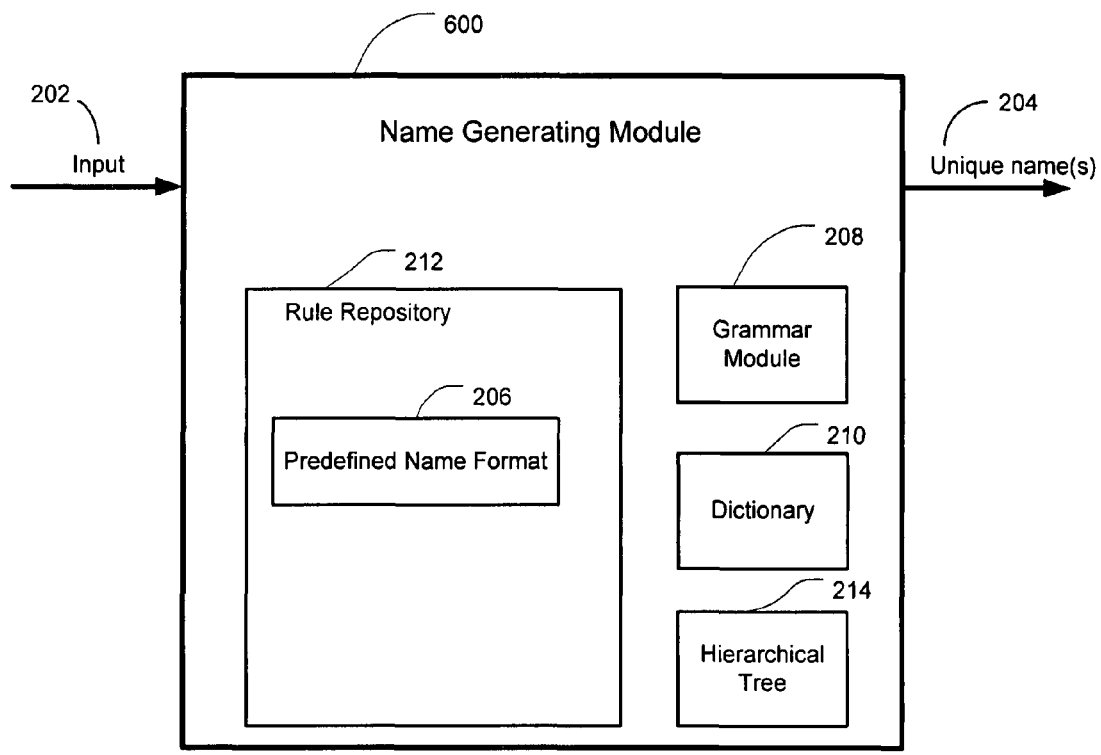
FIG. 6 is a block diagram of a system that generates unique names using input definitions.

The names can be generated to be consistent with a naming rule for the intermediate schema. There will now be described examples of using generated names to aid the creation of a mapping. FIG. 6 shows an example of a name generating module 600 that is capable of generating unique names for data elements using the definition for each respective element. The system 10 can use the name generating module 600 to generate DENs for each of the nodes in the input schema before importing the input schema into the procedure 400. Using the generated DENs, the matching procedure 400 can map one or more of the nodes from the imported schema to the output schema.

The name generating module 600 receives input 202 that can include definitions for the data elements and the element names from the external schema. The module 600 uses the input 202 to create unique name(s) 204 as output. For example, the definition 202 may define a data element (e.g., a node in a schema). The exemplary name generating module 600 includes a predefined name format 206, a grammar module 208, a dictionary 210, a rule repository 212, and a hierarchical tree 214. The definition that is received in the input 202 is formulated in a human-understandable descriptive language. This means that the definition 202 is composed of terms, phrases or expressions corresponding to, and consistent with, those vocabularies included in the dictionary 210 and furthermore follows the grammar defined in the grammar module 208. For example, the definition 202 may be composed of one or more sentences in English.

The predefined format 206 defines the requirement of the format of the generated unique name 204. For example, the predefined format 206 could be an international standard for generating DENs, such as the ISO 11179 and the rules of UN/CEFACT Core Component Technical Specification (CCTS). In another example, the predefined name format 206 may also be a private naming convention agreed between two or more business partners.

The name generating module 600 goes through a process to generate unique names 204 that comply with the predefined name format 206. The process may use rules stored in the rule repository 212. The name generating module 600 may apply the rules to the definition 202 to obtain one or more nouns that are useful for generating the unique name 204. This may involve using a set of rules based on generative and transformational grammar, which is a proof theoretical approach to the study of syntax of sentences. Such rules may be inspired by a formal grammar of precisely describing a formal language. One of the essential parts of this formal grammar is the representation of context-free grammars (defined in the Chomsky-Hierarchy), which can be depicted as a derivation tree. This derivation tree is a key part for analyzing sentences and representing the coherence of words in sentences by subordinate and superordinate branches connected at nodes. According to these branches and nodes, it is possible to derive the correct terms of a DEN, getting the unambiguous meaning that is originally represented in the definition sentence. The correct derivation and serialization of terms are based on further rules, in addition to the generative and transformational grammar.

In one embodiment, the name generating module 600 may first parse the definition into at least one noun phrase and at least one verb phrase. The name generating module 600 may use a first noun obtained from the noun phrase, a second noun obtained from the verb phrase, and a third noun associated with the verb phrase to create the unique name 204. The rules may also define how to truncate a word obtained from the input 202.

In some embodiments, the predefined name format 206 can require the unique name 204 to include an object class term, a property term and a representation term. An object class term is a part of a unique name of a data element that represents the object class to which it belongs. A property term is a part of a unique name of a data element that expresses a property of an object class. A representation term is a part of a unique name that represents the form of a set of valid values for a data element, due for example to the data element being defined as having a certain data type. The object class terms, property terms, and representation terms may be those used with implementations of the CCTS standard.

The name generating module 600 may parse the definition 202 to generate the hierarchical tree 214 in order to obtain the object class term, the property term, and the representation term for generating the unique name 204. As an illustrative example, the name generating module 600 generates a dictionary entry name that consists of three terms using the hierarchical tree 214. A first term is an object class term. A second term is a property term. A third term is a representation term. For example, the definition 204 may be, "This identifier identifies the person." Then, the name generating module 600 selects the noun "identifier" as the representation term and the noun "person" as the object class term. To obtain the property term, the name generating module 600 converts the verb "identifies" in into a noun associated with the verb phrase "identifies the person". The name generating module 600 may use the dictionary 210 for this conversion. For example, the name generating module 600 obtains the property term by converting the verb "identifies" in the verb phrase "identifies the person" into a noun "identification". The name generating module 600 generates a DEN by combining the obtained terms resulting in a DEN "person.identification.identifier".

Using the resulting DEN, the DEN matcher 404a can match the generated unique name 204 with names in the intermediate schema. Further examples of generating unique names are described in pending patent application Ser. No. 11/400,837, entitled "Generating a Unique Name for a Data Element", the contents of which are incorporate herein by reference. In this implementation, the result is a new external schema that has three categories of information:

1.) The elements and types that are based on CCTS notation.

2.) The reference for each element and type to its origin representation as it was in the external schema (can be used for a later conversion in runtime).

3.) The context specific categorization of all elements.

These information categories will be used for the next step, the matching procedure 400. The matching procedure considers all three parts by its different schema matcher—

Figure 7:
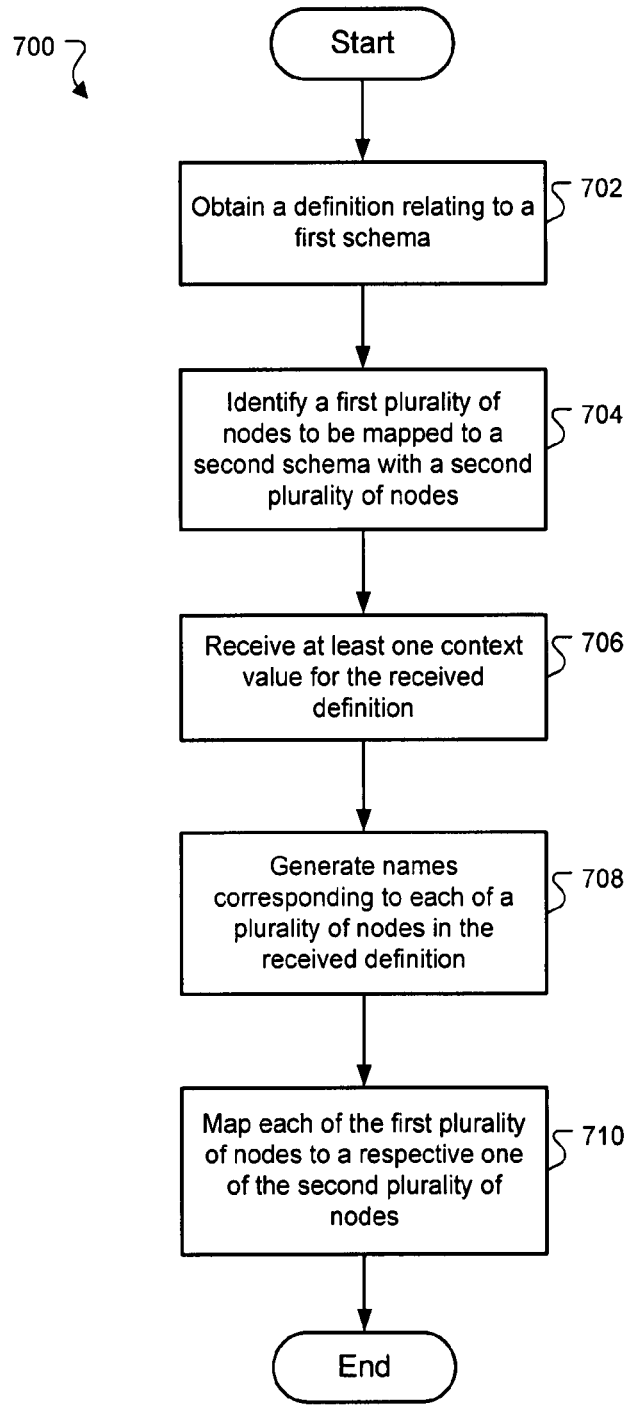
FIG. 7 is a flow chart illustrating a process of creating a mapping.

FIG. 7 is a flow chart of exemplary operations 700 that can be performed for creating a mapping. The operations 700 can be performed by a processor executing instructions stored in a computer program product. The operations 700 begin in step 702 with obtaining a definition relating to a first schema. For example, the matching procedure 400 receives a definition related to the imported schema, such as a mapping between two schemas, or a business data interface definition, as indicated by the arrow 402.

In step 704, the operations 700 can comprise identifying a first plurality of nodes to be mapped to a second schema with a second plurality of nodes. For example, the procedure 400 identifies nodes in the imported mapping between schemas, so that the identified nodes can be mapped to the output schema. In other implementations, this step can be omitted. For example, the plurality of nodes can be implicitly generated in connection with step 710 below.

In step 706, the operations 700 comprise receiving at least one context value for the received definition. For example, the process 500 receives context values of one or more context categories (e.g., the context categories 510) by generating the GUI 508 and receiving user input from the GUI 508. This receipt of context value(s) can precede the procedure 400, for example as shown in FIG. 5. The context values can be assigned to the elements of the schema. In another example, the context value definition may be available in the imported schema or from online documents of the imported schema.

In step 708, the operations 700 comprise generating names corresponding to each of the nodes in the first plurality. The generated names are consistent with a naming rule for the second schema. For example, the name generating module 600 generates DENs for each of the nodes in the imported schema. The names can be generated so that they are consistent with the naming convention for CCTS, to name one example.

In step 710, the operations 700 comprise mapping each of the first plurality of nodes to a respective one of the second plurality of nodes. The context value and at least one of the generated names are taken into account in the mapping. For example, the matching procedure 400 uses the similarity cube 406, and the combination stage 408 to combine matching results from the matching components 404. After combining the matching results, each node in the imported schema is mapped to a respective node in the output schema.

Figure 8:
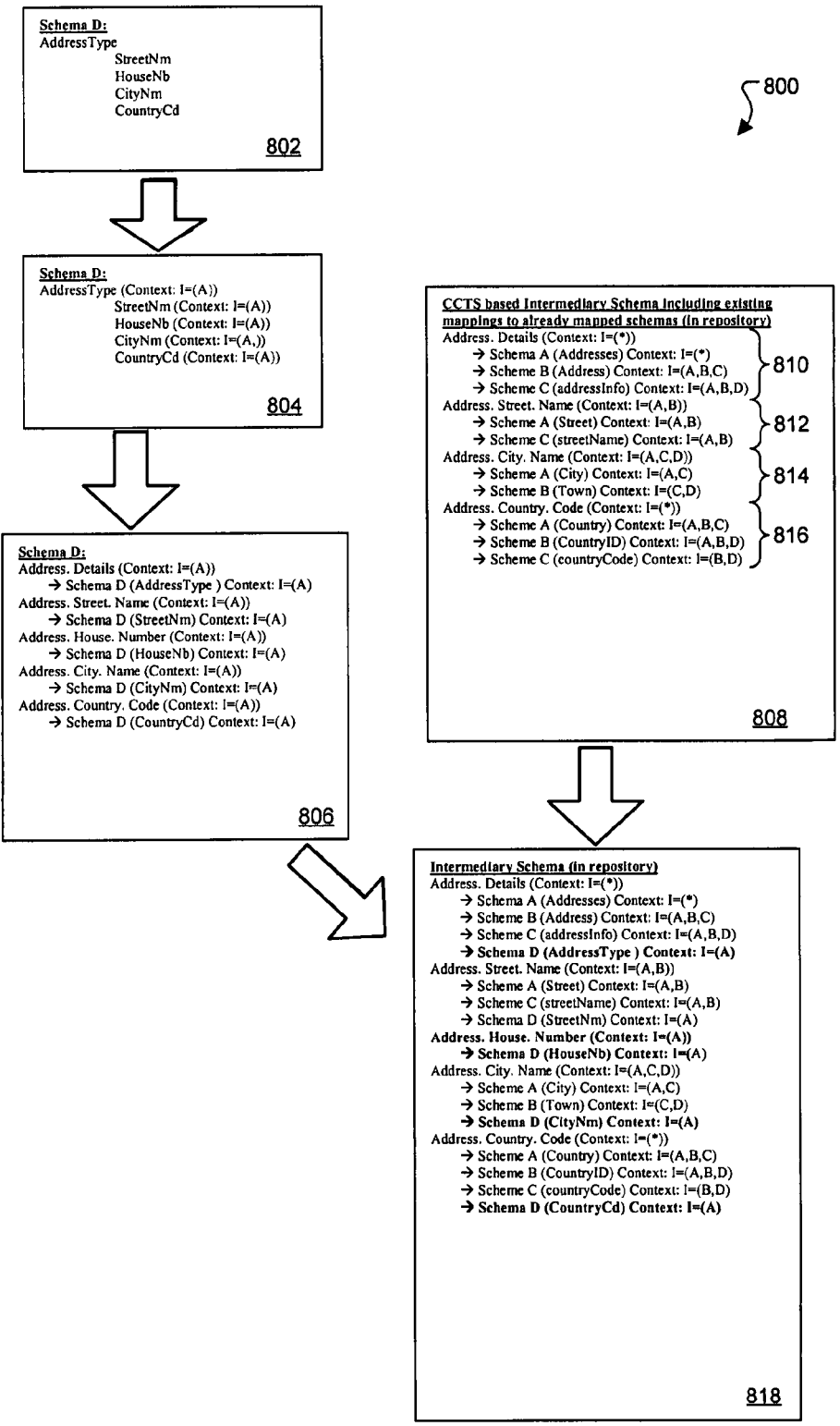
FIG. 8 shows an example of a procedure that uses already mapped elements to generate new mappings.
Figure 10:
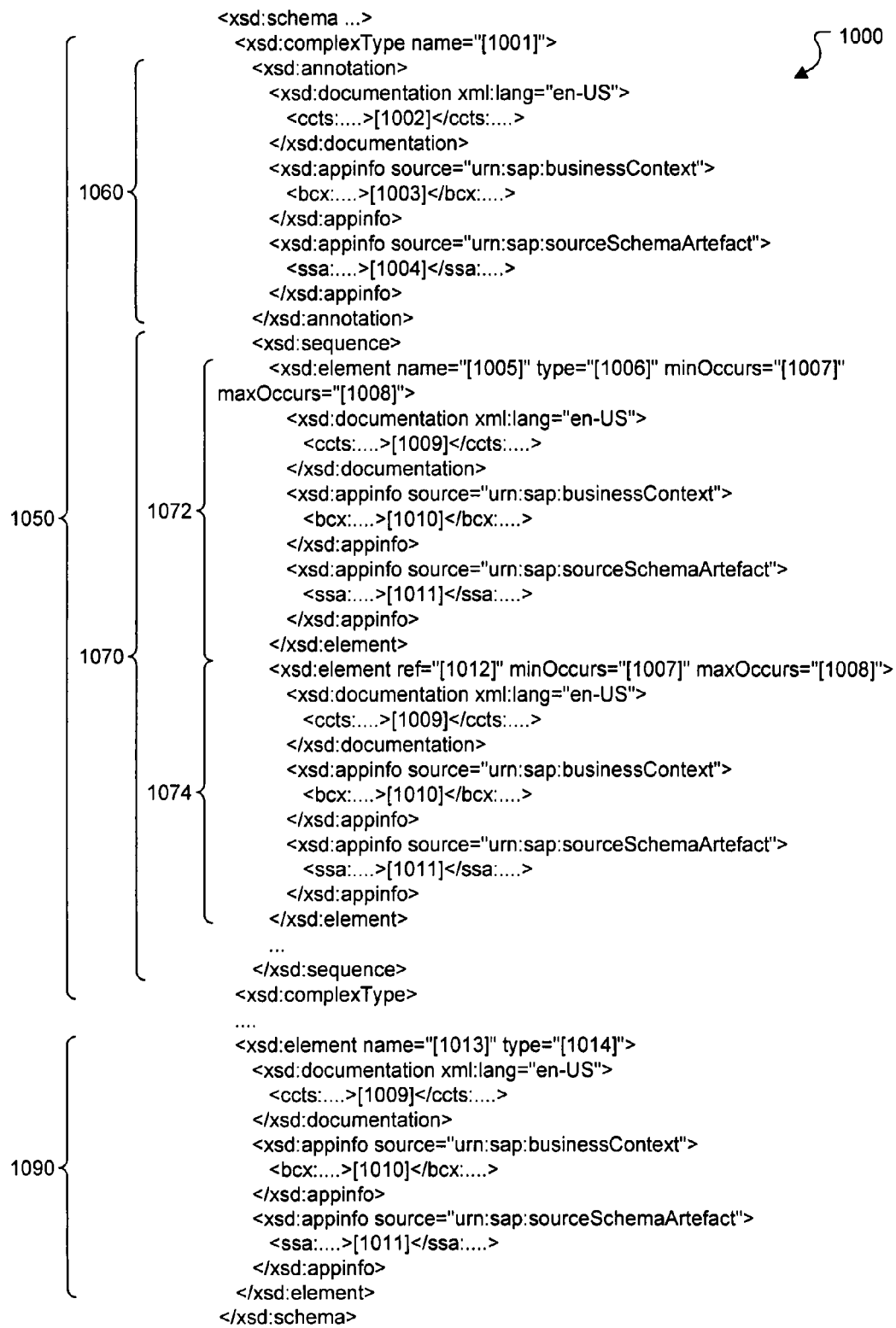

In some implementations, and with reference again to FIG. 1, the system 10 can create the mapping 50 by first enriching context to the first schema using the process 500, generating DENs for the data types and data elements of the first schema 20 using the name generating module 600, and performing the transformation according to FIG. 10. FIG. 8 shows a procedure 800 that is an example of such a process. In short, this example involves importing a schema D, setting a context for it, transforming it to a CCTS convention, and performing the mapping to an intermediate schema.

In more detail, then, an input schema 802 is imported to the procedure 800 to be mapped to an intermediary schema. As shown, the input schema is the schema D and includes an address type. The address type includes four nodes StreetNm, HouseNb, CityNm, and CountryCd.

The procedure 800 first assigns context values to the input schema 802. In this example, the procedure 800 can enrich the input schema 802 with a context value I=(A). A context enriched schema 804 is generated. As shown, every node in the schema D is enriched with the context value, I=(A). For example, the AddressType of the schema D is enriched to become AddressType (Context: I=(A)). For example, the nodes StreetNm, HouseNb, CityNm, and CountryCd within the AddressType are also enriched to become StreetNm (Context: I=(A)), HouseNb (Context: I=(A)), CityNm (Context: I=(A)), and CountryCd (Context: I=(A)), respectively.

Next, the procedure 800 transforms the enriched schema 804 into a transformed schema 806. In this example, a one-to-one mapping between a DEN and a node in the schema 804 is generated. For example, the name generating module 600 can generate a node for each of the nodes, AddressType, StreetNm, HouseNb, CityNm, and CountryCd based on the CCTS conventions. As shown, a new layer of definition is generated that includes a DEN of each of the nodes. Each of the DENs is associated with a child node that represents the original presentation of this element. The DENs are also enriched with the context values assigned to the original presentation of the elements. For example, the transformed schema 806 includes an Address. Details (Context: I=(A)) having a child node Schema D (AddressType) Context: I=(A), an Address. Street. Name (Context: I=(A)) having a child node Schema D (StreetNm) Context: I=(A), an Address. House. Number (Context: I=(A)) having a child node Schema D (HouseNb) Context: I=(A), an Address. City. Name (Context: I=(A)) having a child node Schema D (CityNm) Context: I=(A), and an Address. Country. Code (Context: I=(A)) having a child node Schema D (CountryCd) Context: I=(A).

The procedure 800 uses different matchers, such as the matchers described with reference to FIG. 4. Using the matchers, the procedure 800 can compare each child node relating to the schema D with existing nodes in a repository 808 (e.g., the repository 350 in FIG. 4) that includes the nodes of the already mapped standards. In this example, the repository 808 includes nodes 810, 812, 814, 816 of the intermediary schema. Each of the nodes 810, 812, 814, 816 includes one or more child nodes. The child nodes are entities of another schema (e.g., schema A, schema B, schema C) that are mapped to their corresponding parent nodes in the intermediary schema.

To create a mapping between the schema D and the intermediary schema, the mapping procedure 800 attempts to assign the nodes in the transformed schema 806 to any of the nodes 810, 812, 814, 816 in the intermediary schema in repository 808 based on the DEN and the context of the nodes. In this example, the result is that the child node "Schema D (AddressType) Context: I=(A)" is assigned to the node 810; the child node "Schema D (StreetNm) Context: I=(A)" is assigned to the node 812; the child node "Schema D (CityNm) Context: I=(A)" is assigned to the node 814; and the child node "Schema D (CountryCd) Context: I=(A)" is assigned to the node 816.

The DEN "Address. House. Number (HouseNb)" does not exist in the repository 808. Therefore, the mapping procedure 800 can integrate the node "Address. House. Number" into the repository 808. As a result, an intermediary schema 818 is generated with the new semantic. This can be viewed as an extension of the intermediate schema because the new node was added. The new intermediary schema can be stored in the repository and be used in mappings.

Figure 9:
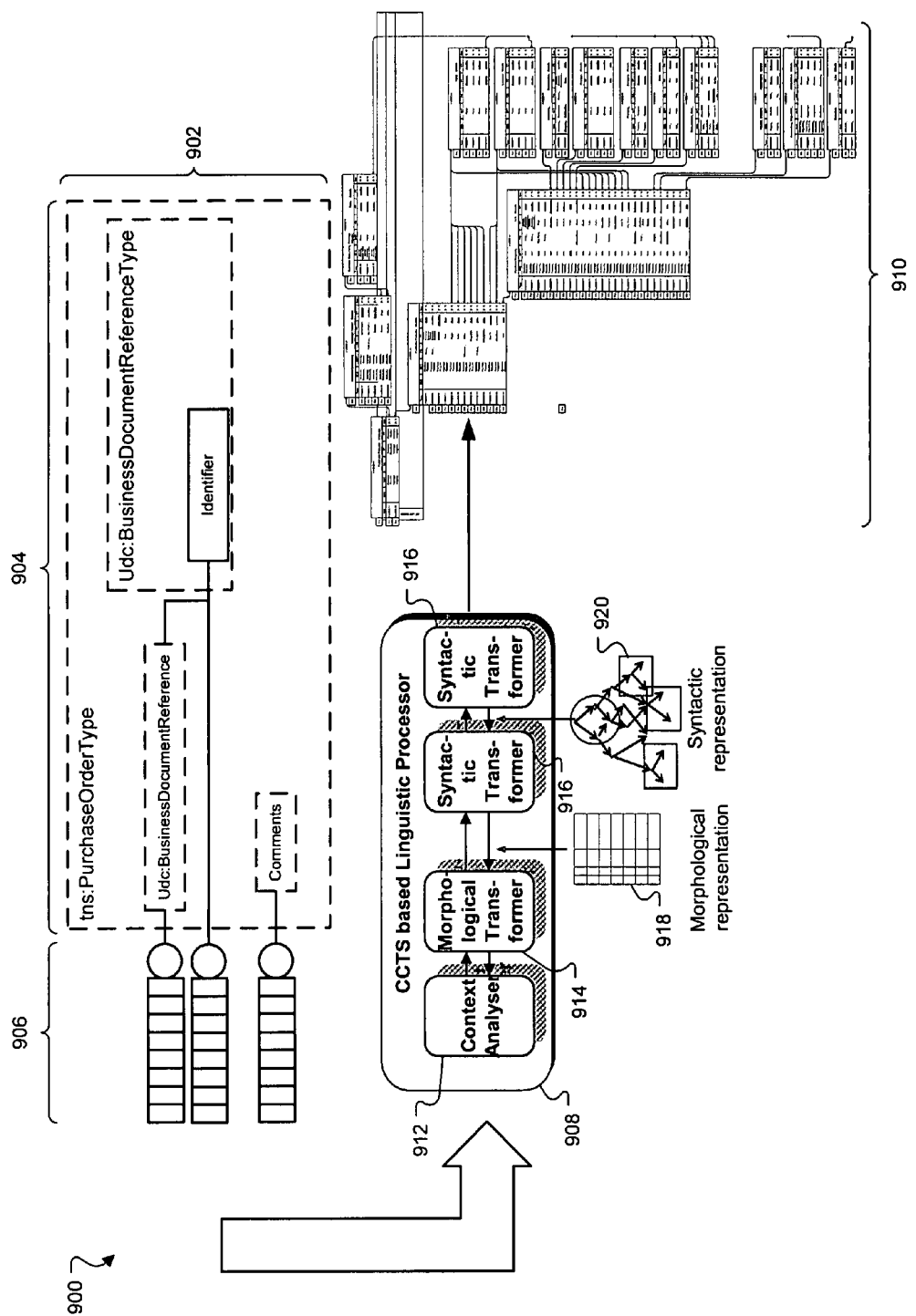
FIG. 9 shows an example of transforming a contextualized schema into a standards-based notation.

FIG. 9 shows an example of transforming a contextualized schema into a standards-based notation. A transformation 900 shown here can take an incoming schema enriched with context values as its input and can generate an outgoing schema that is a representation according to a standards-based convention, such as a CCTS representation. For example, the transformation 900 can be performed after the process 500 shown in FIG. 5 and before the process 400 shown in FIG. 4.

Here, the transformation 900 receives a schema 902 as its input. For example, the schema 902 can be a RosettaNet representation of a purchase order document. The schema 902 includes a schema portion 904 and context values 906 associated with the nodes in the schema portion 904. For example, the context values 906 may have been associated with the schema nodes as part of the process 500 (FIG. 5).

The received schema is provided to a linguistic processor for normalization according to a standard. Here, the transformation 900 passes the schema 902 to a CCTS-based linguistic processor 908. An output of the linguistic processor 908 in this example is a CCTS-based representation 910 of the incoming schema. The CCTS-based representation 910 has a CCTS-compliant representation of the nodes in the schema 902 that includes the proper DENs, is organized in a coherent multilevel structure of nodes, and that is further enriched with parameters from the original (here: RosettaNet) schema. Moreover, the CCTS-based representation 910 also includes the context values obtained from the schema 902. As such, the CCTS-based representation 910 can be used as an input to the procedure 400 (see FIG. 4). For example, the CCTS-based representation 910 can correspond to the transformed schema 806 (see FIG. 8).

The CCTS-based linguistic processor 908 can include a context analyzer 908, a morphological transformer 914 and one or more syntactic transformers 916. The context analyzer 908 can analyze one or more of the context values 906 for creating the CCTS-based representation 910. For example, the context value(s) can be analyzed to determine whether a representation already exists for the specified context.

The morphological transformer 914 can perform one or more morphological transformations (e.g., an inflection, a derivation, and/or a compounding) on words included in the schema 902. This can result in a morphological representation 918 as an intermediate result from the CCTS-based linguistic processor 908. For example, the morphological representation 918 can include words inflected, derived and/or compounded from the original (here: RosettaNet) schema.

The one or more syntactic transformers 916 can perform one or more syntactic transformations on the schema 902, for example to transform a RosettaNet-based syntax to a CCTS-based syntax. This can result in a syntactic representation 920 as an intermediate result from the CCTS-based linguistic processor 908. For example, the syntactic representation 920 applies the CCTS-based syntax to the contents of the schema 902. In some implementations, the CCTS-based representation 910 is created by merging the morphological representation 918 and the syntactic representation 920.

In some implementations, the CCTS based representation 910 can be implemented using a ready to map format (RTMF). For example, the RTMF is based on the XML Schema representation according to rules of XML Naming and Design Rules (XMLNDR) for CCTS. In one example, the RTMF can be used to transform the input schema 902, which may or may not be CCTS based, (e.g., Universal Business Language (UBL), RosettaNet, CIDX, etc.) for mapping into a repository of a CCTS Modeler Warp 10 by a semi automatic mapping approach (e.g., the approach used in the process 400.

The RTMF in this example includes CCTS specific aspects, business context classification, and other information describing a structure of an input schema (e.g., the input schema 902). In some implementations, the system 10 can use the RTMF to generating mappings for external business to business (B2B) libraries, including both CCTS based B2B libraries and not CCTS based B2B libraries based on other structures and conventions. For example, one or more RTMF entities can be contextualized to provide a higher precision during the mapping procedure (e.g., the process 400).

A CCTS based B2B library need not be serialized into the RTMF because the RTMF follows completely the conventions of the XML Naming and Design Rules (XMLNDR) for CCTS. In contrast, the characteristics of entities of other B2B schemas may need to be serialized into appropriate aspects of the source schema artifact area.

FIGS. 10-13 show example codes 1000, 1100, 1200, 1300 of a schema representation in the RTMF. The codes 1000, 1100, 1200, 1300 includes elements that may be optional. For example, the optional elements may not be included in all of the RTMF artifacts. Some elements in the codes 1000, 1100, 1200, 1300 may be repetitive. For example, the artifacts can include more than one of the repetitive elements. The codes include nillable elements. For example, the nillable elements can have an element value of "null".

As shown in FIG. 10, the code 1000 defines an example structure of a primary construct of an RTMF schema. As shown, the code 1000 includes definitions of at least one complex type entity 1050 and a global declared element 1090.

An entity name 1001 may be a name of the ABIE complying with the XMLNDR conventions. The information is optional, because the information can only be filled from an available CCTS based ABIE.

The complex type entity 1050 includes an annotation element 1060 and a sequence element 1070. The annotation element 1060 optionally includes a CCTS based documentation 1002 and a business context 1003. The CCTS based documentation 1002 is a CCTS based documentation of the ABIE. In some implementations, information in the documentation 1002 optional, because the information can only be filled from an available CCTS based ABIE. The documentation 1002 schema construct can be imported. An example code of the CCTS based documentation 1002 is described below with reference to FIG. 11.

The business context 1003 can specify a business context of the specific ABIE. The business context 1003 may be filled independent of whether the source schema is based on CCTS conventions. In some implementations, the business context 1003 is imported. An example code of the business context 1003 is described with reference to FIG. 12.

The annotation element 1060 includes one or more element definitions 1004. For example, the element definitions 1004 may specify characteristics of the specific ABIE if the characteristics are from a B2B schema that is not based on CCTS conventions. The element definitions 1004 may need to be filled if the source schema is not based on CCTS conventions. In some implementations, the element definitions 1004 can be imported. An example code of the element definitions 1004 is described with reference to FIG. 13.

The sequence 1070 includes a local declared element 1072 and at least one global declared element 1074. For example, the local declared element 1072 is a BBIE or an ASBIE that is a composition. The composition is described in UML conventions. The local declared element 1072 includes an element name 1005, an entity element type 1006, a minimal occurrence 1007, and a maximal occurrence 1008. For example, the values 1005-1008 can specify properties of the local declared element 1072. The element name 1005 is a name of the BBIE or ASBIE according to the XMLNDR conventions if the BBIE or ASBIE is represented as a local declared element. The element name 1005 may be optional. In some examples, the entity name 1005 can be filled if a CCTS based BBIE or ASBIE is available.

The element type 1006 is a type of the specific BBIE or ASBIE is based on. In some implementations, the element type 1006 is described according to the XMLNDR conventions. For example, the element type 1006 can be either a business data type (BDT) or an ABIE that represents a composition. In some implementations, the element type 1006 may be optional. For example, the element type 1006 can be filled if a CCTS based BBIE or ASBIE is available.

The minimal occurrence 1007 is a minimal occurrence of a BBIE or an ASBIE. The minimal occurrence 1007 is used for both CCTS based and non CCTS based libraries. The minimal occurrence 1007 can include values based on the XML Schema convention. Some example values are "No occurrence" representing a mandatory occurrence of the element, an integer value representing a number of minimal occurrences of the BBIE or the ASBIE, or "unbounded" representing an infinite number of occurrences of the BBIE or the ASBIE, to name a few examples.

The maximal occurrence 1008 is a maximal occurrence of a BBIE or an ASBIE. The maximal occurrence 1008 is used for both CCTS based and non CCTS based libraries. The maximal occurrence 1008 can include values according to the XML Schema convention. Similar to the minimum occurrence 1007, example values are "No occurrence", an integer value, or "unbounded", to name a few examples.

The definition of the local declared element 1072 includes a CCTS based documentation 1009, a business context 1010, and a characteristic 1011. The CCTS based documentation 1009 is a CCTS based documentation of the BBIE or ASBIE. For example, the CCTS based documentation 1009 may be optional. In some implementations, the CCTS based documentation 1009 can be filled if a CCTS based BBIE or ASBIE is available. The CCTS based documentation 1009 can be imported. An example the CCTS based documentation 1009 is described with reference to FIG. 11.

The business context 1010 specifies a business context of the specific BBIE or ASBIE. The business context 1010 may be filled if a CCTS based BBIE or ASBIE is available. In some implementations, the business context 1010 may be imported. An example of the business context 1003 is described with reference to FIG. 12.

The characteristics 1011 include the characteristics of the specific BBIE or ASBIE, for example, if the BBIE or ASBIE is obtained from a B2B schema that is not based on CCTS conventions. The characteristics 1011 may be filled if the source schema is not based on CCTS conventions. The characteristics 1011 may be imported from the input schema. An example code of the element definitions 1011 is described with reference to FIG. 13.

The global declared element 1074 is specified using a reference 1012, the minimal occurrence 1007, and the maximal occurrence 1008. For example, the reference 1012 is a name of the ASBIE according the XMLNDR conventions if the ASBIE is a global declared element or even an aggregation. The aggregation is described in the UML conventions. The information of the reference 1012 can be optional. The information can only be filled if a CCTS based ASBIE is available.

The global declared element 1090 is declared using a name 1013 and a type 1014. For example, the name 1013 is a name of the global declared element of an ABIE based on the XMLNDR conventions. The ABIE can be a root element of a message or an aggregation. In some implementations, the name 1013 can be optional. The name 1013 can only be filled if a CCTS based ABIE is available.

The global declared element 1090 is based on a type 1014 that is the type of which the specific ABIE is based on. For example, the ABIE is either a root ABIE or representing a stand alone object that can be used for aggregations. The type 1014 is described based on the XMLNDR conventions. In some implementations, the type 1014 can be optional. For example, the type 1014 can only be filled if a CCTS based ABIE is available.

As shown in FIG. 11, the code 1100 is an example of a documentation schema for artifacts described in FIG. 10. For example, the documentation schema can be used to specify one or more metadata as specified in the CCTS (e.g., to convey the semantic content carried in the XML construct). In one example, the annotation documentation 1100 can include annotations defined in section 7 of the XMLNDRs. In the depicted example, the code 1100 includes a unique identifier 1102, an acronym 1104, a DEN 1106, a version 1108, a definition 1110, an object class term 1112, an object class qualifier 1114, a usage rule 1116, a business term 1118, and an example 1120.

The unique Identifier 1102 is an identifier assigned to the artifacts associated with the documentation in the B2B library.

The acronym 1104 is an abbreviation of a type of the component. In the depicted example, the acronym 1104 is associated with a value of "ABIE", representing an aggregation business information entity. Other acronyms are, for example, BBIE (basic business information entity), ASBIE (associated business information entity), BDT (business data type), BDTSC (business data type supplementary component), or MSG (message), to name a few examples.

The DEN 1106 is a complete name of the artifact in the library.

A name can be a name of a supplementary component or a business information payload. The name can be represented in XML code as "Name".

The version 1108 is a version of the artifact as assigned by the repository.

The definition 1110 specifies a semantic meaning of the artifact.

The code 1100 may optionally include a cardinality (e.g., represented as "Cardinality" in XML code) associated with the artifact. For example, the cardinality can indicate whether the artifact is not-applicable, optional, mandatory, and/or repetitive characteristics of the object.

The object class term 1112 is an object class represented by the artifact. The object class qualifier 1114 is one or more terms that qualifies the object class of the artifact. For example, a qualifier "order value" can qualify a term "attribute". In another example a qualifier "positive integer" can qualify a term "type". In some implementations, the terms and the qualifiers complies the CCTS convention for DEN. In one example, the names can be generated using the name generating module 600 as described in FIG. 6.

The documentation 1100 can include a property term represented by the artifact. For example, the property term can be represented as "PropertyTerm" in XML code. The documentation 1100 can include one or more property qualifier terms qualifying the property term. For example, the property qualifier term can be represented as "PropertyQualifier" in XML code.

The documentation 1100 can include a representation term that is a primary representation term represented by the artifact. For example, the representation term can be represented as "RepresentationTerm" in XML code. The documentation 1100 can include a representation qualifier that qualifies the representation term. For example, the representation qualifier term can be represented as "RepresentationQualifier" in XML code.

The documentation 1100 can include an association type of the ABIE. For example, the association type can be represented as "AssociationType" in XML code.

The documentation 1100 can include a data type term represented by the artifact. For example, the data type term can be represented as "DataTypeTerm" in XML code. The documentation 1100 can include a data type qualifier that qualifies the data type term. For example, the data type qualifier can be represented as "DataTypeQaulifier" in XML code.

The documentation 1100 can include a primitive type that represents a primitive data type assigned to the artifact by CCTS. For example, the primitive data type can be represented as "PrimitiveType" in XML code.

The usage rule 1116 specifies a constraint that describes specific conditions applicable to the artifact.

The business term 1118 is a synonym term under which the artifact is commonly known and used in business.

The example 1120 can specify a possible value for the artifact.

As shown in FIG. 12, the code 1200 specifies a business context schema. In some implementations, the code 1200 can specify business context using values selected from a specific business context value list.

The code 1200 includes a unique identifier 1201 and a version identifier 1202 of the business context. For example, each of the unique identifier 1201 and the version identifier 1202 may be non-repetitive and have an UDT of IDType. In one implementation, the unique identifier 1201 may be mandatory. In some implementations, the version identifier 1202 may be optional.

The code 1200 specifies business context in various business context categories 1205, 1208, 1212, 1214, 1216, 1218, 1220, 1225, 1227, and 1230. For each of the business context categories 1208, 1212, 1214, 1216, 1218, 1220, 1225, 1227, and 1230, the code 1200 includes an excluded indicator 1203 and an all context values indicator 1204.

The excluded indicator 1203 is a boolean flag or parameter that may be optionally included in any or all definitions of business context category 1208, 1212, 1214, 1216, 1218, 1220, 1225, 1227, and 1230. For example, the excluded indicator 1203 can indicate whether a subsequent list is a negative list that contains values to be excluded from the set of valid context values. For example, the excluded indicator 1203 includes a "true" value to indicate that the subsequent list is a negative. In one example, negative lists are to be used if less than a half of the universal context values set are invalid for a current case. Otherwise, positive lists (+) are to be used. In some examples, the excluded indicator 1203 may be used if the all context values indicator 1204 is set to true.

The all context values indicator 1204 may be an optionally included boolean flag or parameter. For example, the all context values indicator 1204 can be set to true to include all context values into the current context. In some examples, single values can be excluded using the excluded indicator 1203. For example, for a given universal set of values {a, b, c, d, e, f, g} with a set of valid values {a, b, c, d}, a negative list can be used for a context value to exclude {e, f, g} as follows.

```
< . . . excludedIndicator=true allContextValuesIndicator=true>
  <>e<>
  <>f<>
  <>g<>
</ . . . >
```

The business information context categories 1205 may be optional and repetitive. The business information context category 1205 optionally includes a business information entity ID 1206 and a business data type ID 1207. For example, the business information entity ID 1206 may be repetitive and nillable. In one implementation, the business information entity ID 1206 may be a UDT of IDType. In some implementations, the business information entity ID 1206 uses a business context value list to determined an identifier list of all unqualified and qualified ABIEs because associated subjacent ABIEs, BBIEs, or BDTs may have a specific context specific view belonging to the superjacent ABIE. In some implementations, a business context value list is not required.

The business information context category 1205 optionally includes a business data type ID 1207. The business data type ID 1207 may be repetitive and nillable. In one implementation, the business data type ID 1207 may be a UDT of IDType. In some implementations, the business data type ID 1207 can use a business context value list that is based on an identifier list of all unqualified and qualified BDTs because content components or even supplementary components can have specific characteristics according the qualified BDT. In some implementations, a business context value list is not required.

The code 1200 can optionally include one or more of the business process context category 1208. The business process context category 1208 is repetitive. In general, an important aspect of describing a business situation is business activities being conducted. For example, the business process context category 1208 may unambiguously identify business activities being conducted. In some implementations, the business process context category 1208 uses a common point of reference to ensure consistency with the business process activities. For example, a definitive point of reference for international standards is the UN/CEFACT Catalogue of Common business processes.

The business process context category 1208 includes a business process type code 1209, a business transaction type code 1210, and a business transaction message type code 1212. One or more of the business process type code 1209 may be optionally specified. For example, the business process type code 1209 may be nillable and repetitive. In one implementation, the business process type code 1209 may be an "Unqualified Data Type" (UDT), sometimes also referred to as a "Core Data Type". A UDT is a generic representation of the "Code. Type". The "Code. Type" could also be restricted as "Country_Code. Type", for example. In one example, a valid business context value list may be the BusinessProcessCodeList.

The business transaction type code 1210 may be optional, repetitive, and nillable. For example, the business transaction type code 1210 may be a Code. Type. In some implementations, the valid business context value list need not be required.

The business transaction message type code 1211 may be optional, repetitive, and nillable. For example, the business transaction message type code 1211 can have a Code. Type. In one example, a valid business context value list for the business transaction message type code 1211 is a MessageTypeCodeList.

The business process role context category 1212 may be optional and repetitive. In one example, the business process role context category 1212 includes aspects of a business situation that are specific to an actor or actors within the business process. Values of the business process role context category 1212 can be taken from a set of role values provided by the UN/CEFACT Catalogue of Common Business Processes. In one implementation, the business process role context is specified by using a value or set of values from the set of role values from this source.

The business process role context category 1212 includes a party function code 1213. The party function code 1213 may be optional, repetitive, and nillable. The party function code 1213 can be a Code. Type. For example, the party function code 1213 represents the business process role of a specific business party. In one example, the party function code 1213 uses a PartyFunctionCode as a valid business context value list.

The supporting role context category 1214 may be optional and repetitive. In one example, the supporting role context category 1214 identifies parties that are not actively participants in the business process being conducted but may have an interest in the business process. The supporting role context category 1214 can be specified with a value or a set of values from a standard classification. The supporting role context category 1214 includes a supporter function code 1215 that may be optional, repetitive, and nillable. The supporter function code 1215 can be a Code. Type. For example, a business context value list need not be required.

The industry classification context category 1216 may be optional and repetitive. In one example, the industry classification context category 1216 includes a description of an industry or a sub-industry in which the business process takes place. An example valid business context value list of the industry context category 1216 is IndustryClassificationCode. The industry classification context category 1216 includes an industry type code 1217. The industry type code 1217 can be optional, repetitive, and nillable. The industry type code 1217 can be a Code. Type.

The product classification context category 1218 may be optional and repetitive. The product classification context category 1218 specifies aspects of a business situation related to goods or services being exchanged by, or otherwise manipulated, or concerned, in the business process. Some recognized code lists can be used to provide authoritative sources of product classification contexts. The product classification context category 1218 includes a product type code 1219. The product type code 1219 is optional, repetitive, and nillable. The product type code 1219 can be a Code. Type. In one example, the product type code 1219 may not require a business context value list.

The geopolitical context category 1220 may be optional and repetitive. The geopolitical contexts category 1220 includes a description of aspects of the business context related to region, nationality, or geographically based cultural factors. The geopolitical context category 1220 includes a continent code 1221, a country code 1222, a region code 1223, and a language code 1224. In some examples, the continent code 1221, the country code 1222, the region code 1223, and the language code 1224 may be optional, repetitive, and nillable. In some examples, the continent code 1221, the region code 1223, and/or the language code 1224 may not require a business context value list. The continent code 1221, the region code 1223, and the language code 1224 can be a Code. Type. The country code 1222 can be a UDT of CountryCodeType and use CountryCode as a business context value list.

The official constraints context category 1225 may be optional and repetitive in the code 1200. For example, the official constraints context category 1225 describes aspect of a business situation that result from legal or regulatory requirements, and similar official categories. The category 1225 includes regulatory and legislative requirements, and conventions and treaties requirements. The regulatory and legislative requirements can be unilateral in nature. The regulatory and legislative requirements include, for example, customs authority regulations. The conventions and treaties requirements include bi- or multilateral agreements. For example, the conventions and treaties requirements can include different constraints imposed by the regulatory and legislative requirements.

The official constraints context category 1225 includes a law code 1226. For example, the law code 1226 may be optional, repetitive, and nillable. For example, the law code 1226 can be a Code. Type. The law code 1226 may not require a business context value list.

The system capabilities context category 1227 may be optional and repetitive. In one example, the system capabilities context category 1227 identifies a system, a class of systems, or standard in a business situation. In one implementation, the system capabilities context category 1227 can require at least one pair of values: an identification of the classification scheme being used and a value from that scheme. In some examples, more than one pairs of values are permitted.

The system capabilities context category 1227 includes a software solution ID 1228. For example, the software solution ID 1228 may be optional, repetitive, and nillable. For example, the software solution ID 1228 can be a UDT of IDType. The system capabilities context category 1227 can also include a schema library ID 1229. The software solution ID 1228 may not require a business context value list. The schema library ID 1229 can be used for the identification of specific business process standards and libraries, such as RosettaNet, EDIFACT, Chemical Industry Data Exchange (CIDX), and proprietary libraries that considers business data models, such as intermediate document (IDoc), business application programming interfaces (BAPIs), global data types (GDTs). For example, the schema library ID 1229 may be optional, repetitive, and nillable. For example, the schema library ID 1229 can be a UDT of IDType. For example, a Uniform Resource Name (URN) based format should be used without the "urn:sap" prefix, such as PIP:V2.0:RosettaNet. For example, the schema library ID 1229 can include a schema source that represents a library name and a version (e.g. PIP:V2.0:RosettaNet). The schema library ID 1229 can also include a responsible agency that represents a name or a code of the responsible agency. If the responsible agency is a code, the code is selected from the United Nations Economic Commission for Europe (UNECE) code list. In one example, the schema library ID 1229 can use a SchemaLibraryID as a valid business context value list.

The user context category 1230 may be optional and repetitive. In one example, a user ID may be required in the user context category 1230. The user context category 1230 includes a party ID 1231. The party ID 1231 can be may be optional, repetitive, and nillable. For example, the party ID 1231 can be a UDT of IDType.

As shown in FIG. 13, the code 1300 is an example structure for specifying a source schema artifact. The code 1300 includes a documentation element group 1301, a syntax element 1304, a content element 1312, a position element 1325, and a processing element 1329.

The document element group 1301 includes a name 1302 and a description 1303. The document element group 1301 can also include constraint rules of the artifact. The documentation element group 1301 includes information described in a human readable language. For example, the language can be assigned by the xml:lang attribute. The documentation element group 1301 is mandatory and non-repetitive. The documentation element group 1301 includes at least the name 1302 or the description 1303. For more precise matching results, both the name 1302 and the description 1303 are included in the documentation element group 1301. In some implementations, an internet search mechanism may be used to get some or all of the missing information for the name 1302 and/or the description 1303. The name 1302 may be optional and is a non-repetitive string. For example, the name 1302 is a human readable name of the artifact. The name 1302 may be included if the description 1303 is not available. The description 1303 may be optional and is a non-repetitive string. The description 1303 includes text description of a meaning (e.g., a business meaning) of the artifact. The description 1303 may include at least one grammatically correct sentence. In some implementations, the documentation element group 1301 includes the description 1303, if the name 1302 is not available.

The syntax element 1304 may be mandatory and non-repetitive. The syntax element 1304 includes information of a specific syntax of the schema artifact, such as XML, UN/CEFACT, ANSI ASC X12. The syntax element 1304 describes also the characteristics and behaviors of the specific syntax. The syntax element 1304 includes a type code 1305. The type code 1305 may be a mandatory and non-repetitive token. The type code 1305 can specify a type of representation syntax. Some example codes for syntax representation are listed in the following table.

| Code | Name | Description |
| --- | --- | --- |
| CSV | Comma Separated Version | Syntax notation according conventions of comma separated version |
| EDIFACT | UN/EDIFACT | |
| ODETTE | Odette | Syntax notation according convention of non EDIFACT version of Odette |
| SEDAS | Sedas | |
| TRADACOMMS | Tradacomms | |
| VDA | VDA | |
| X12 | ANSI ASC X.12 | |
| XML | Extensible Markup Language | |
| OTHER | — | Other syntax representation that does not fit to the listed syntax |

The syntax element 1304 also includes an artifact type code 1306. The artifact type code 1306 may be a mandatory and non-repetitive token. The artifact type code 1306 includes information of how the artifact is to be represented or specified the specific syntax. The following code values may be used.

| Code | Syntax | Description |
| --- | --- | --- |
| complexType | XML - complexType | The representation of complex type that includes a sequence or choice of element groups, which includes at least further element groups or even elements. |
| Group | EDIFACT - Data Element Group Segment Segment Loop Message XML - Element group that includes child (nested) elements. These elements may have attributes. | The representation of an element group that includes further element groups and/or leaf elements that includes content. |
| Element | EDIFACT - Data element XML - Element | The representation of an leaf element containing content. |
| Attribute | XML - attribute | The representation of an attribute that includes content and may be based on a simpleType. |
| simpleType | XML - simpleType | The representation of a base or primitive type that defines the representation characteristics of an content. |
| Segment | EDIFACT - Segment | |
| Message | EDIFACT - Message | |

The syntax element 1304 includes an artifact name 1307. The artifact name 1307 may be a mandatory and non-repetitive string. The artifact name 1307 is the name of the artifact itself. In one example, the artifact name 1307 can be represented in a human readable form, which is similar to the name 1302 (e.g. XML tag names). In another example, the artifact name 1307 can be an acronym or an artifact identifier (e.g. UN/EDIFACT tag names), which does not carry the semantic in a human readable form.

In some examples, the source schema artifact may not include different syntaxes for globally and locally declared elements because the distinction may have no impact at an instance level. However, nested elements including their documentations may need to be listed at an appropriate position of a sequence or choice structure. If a nested element refers to a globally declared element, specific information to the globally declared element may be represented at the nested elements level. For example, an example definition of the source schema can be include the following code.

```
<complexType name="Partner">
    <xsd:sequence>
        <xsd:element ref="FirstName"/> <!-- Refers to globally declared
            element -->
    </xsd:sequence>
</complexType>
...
<xsd:element name="FirstName" type="Name"/> <!-- Globally
declared element -->
```

In some examples, an example representation of the global element in the source schema artifact may be
<ssa:ArtefactName>FirstName</ssa:ArtefactName>

A typeCode attribute of the artifact name 1307 defines the kind of position. For example, the typeCode attribute may be used if the syntax is not "XML". The attribute can be:

| Code | Name | Description |
| --- | --- | --- |
| StartTag | Start Tag | The name is only shown at the beginning of the artifact instance. For example, the StartTag may be the default code. |
| EndTag | End Tag | The name is shown at the end of the artifact instance. |
| Both | Start Tag and End Tag | The name is shown at both positions, at the beginning and the end of the artifact instance. |
| Omit | None | The name is not shown in the instance. |

The syntax element 1304 can optionally include an artifact base type 1308 that is a non-repetitive string. The artifact base type 1308 refers to a type represented by the artifact type code 1306. The artifact base type 1308 can be used in elements and attributes. The artifact base type 1308 can be used as a reference to valid complexTypes or simpleTypes. For example, one or more xsd:built-in types may be used if the artifact base type 1308 is a simpleType. The following conversion may be considered:

| xsd:built-in type | EDIFACT |
| --- | --- |
| xsd:string | an |
| xsd:string (+pattern="[A-Z]"*) | a |
| xsd:decimal | n |

As discussed above, the source schema artifact does not differentiate between globally and locally declared elements.

If, in the source schema, an element refers to a globally declared element, the specific type of the globally declared element may be represented as the artifact base type 1308. Using the above example code, an example representation in the artifact may be specified as:

```
<ssa:ArtefactName>FirstName</ssa:ArtefactName>
<ssa:ArtefactBaseType>Name</ssa:ArtefactBaseType>
```

In an EDIFACT implementation, nested elements that consider "segments" or "element groupds" may be based on globally defined complexTypes. For example, the artifact name 1307 and the artifact base type 1308 have the same names. For example, the syntax element 1304 in an EDIFACT implementation can be specified as:

```
<Syntax>
    <TypeCode>EDIFACT</TypeCode>
    <ArtefactTypeCode>Group</ArtefactTypeCode>
```

```
    <ArtefactName typeCode="Omit">*_S009_*</ArtefactName>
    <ArtefactBaseType>*_S009_*</ArtefactBaseType>
    <SeparationSign typeCode="EndPostSign"
omitIndicator="TRUE">+</SeparationSign>
</Syntax>
```

As shown in the above code, the artifact name 1307, "S009", is based on a complexType that defines the artifact based type "S009".

The syntax element 1304 can optionally include a fixed length indicator 1309 that is a non-repetitive boolean flag or parameter. For example, the fixed length indicator 1309 indicates whether a length of the artifact is based on a fixed length. In one example, the fixed length indicator 1309 can include a default value being "false". The fixed length indicator 1309 with a "false" value means that the length will always be variable.

The syntax element 1304 can optionally include a fixed length value 1310 that is a non-repetitive integer. The fixed length value 1310 provides the length of the artifact if the length of the artifact is based on a fixed length.

The syntax element 1304 optionally includes a separation sign 1311 that is a repetitive (e.g., unbounded) string. The separation sign 1311 defines the representation of separation signs between the groups, elements, and content. The content of separation sign 1311 is the separation itself. The separation sign 1311 is used if the type code 1305 is not "XML". A typecode attribute of the separation sign 1311 defines the kind of separation signs used. Some examples of separating signs are

| Code | Name | Description |
| --- | --- | --- |
| StartPreSign | Pre Sign of Start Tag | Defines the sign before a start tag, which is defined by the attribute @typeCode in element ArtefactName |
| StartPostSign | Post Sign of Start Tag | Defines the sign after a start tag, which is defined by the attribute @typeCode in element ArtefactName |
| EndPreSign | Pre Sign of End Tag | Defines the sign before an end tag, which is defined by the attribute @typeCode in element ArtefactName |
| EndPostSign | Post Sign of End Tag | Defines the sign after an end tag, which is defined by the attribute @typeCode in element ArtefactName |

The separation sign 1311 also includes an omitIndicator attribute. The omitIndicator attribute is an optional boolean parameter or flag. If the value of an artifact is not shown in an instance, the omitIndicator can defines the non-representation of a separation sign 1311. The default value of the omitIndicator attribute is "true", meaning the separation sign will be omitted if the artifact value is not represented.

The separation sign 1311 is required at an element level (e.g., at a root element or nested elements). The separation sign 1311 is not required for types (e.g., simpleTypes and complexTypes). For example, elements are shown in the instance level.

The content element 1312 is optional and non-repetitive. The content element 1312 defines the representation and characteristics of data content. For example, the content element 1312 can be used for defining leaf elements that consider data content. The content element 1312 includes an example element 1313, a default element 1314, a fixed element 1315, a length value 1316, a minimum length value 1317, a maximum length value 1318, a total digits value 1319, a fraction digits value 1320, a white space code 1321, a pattern 1322, a facet 1323, and a fixed length fill signs 1324.

The example element 1313 can be optionally included and can be a repetitive string. The example element 1313 can include a possible list of valid examples, if at least one example is available.

The default element 1314 can be optionally included and can be a non-repetitive string. In one example, if the default element 1314 is specified and the default element 1314 is empty, then the supplied constraint content may be used as the default element 1314.

The fixed element 1315 can be optionally included and can be a non-repetitive string. If the fixed element 1315 is specified, then the artifact's content may either be empty, in which case the fixed element 1315 behaves as default, or the fixed element 1315 content may match the supplied constraint content. The fixed element 1315 may indicate that the content element 1312, if not empty, is equal to the supplied constraint content.

The length value 1316 can be an optional and non-repetitive integer. The length value 1316 defines a required fixed length of the string. The length value 1316 may impose a format restriction that need not be used in combination with the maximum length value 1317 and/or the minimum length value 1318. The behavior is similar as described in W3C XML Schema (Part II). The length value 1316 can have the same value as the fixed length value 1310, for example, if the fixed length indicator 1309 is "true". In this case, the fixed length value need not be required.

The minimum length value 1317 can be an optional and non-repetitive integer. The minimum length value 1317 can define the minimum length of the string based content. In some implementations, the minimum length value 1317 may not be used in combination with the length value 1316 restriction. The behavior is similar as described in W3C XML Schema (Part II).

The maximum length value 1318 can be an optional and non-repetitive integer. The maximum length value 1318 can define the maximum length of the string based content. In some implementations, the maximum length value 1318 may not be used in combination with the length value 1316 restriction. The behavior is similar as described in W3C XML Schema (Part II).

The total digits value 1319 can be an optional and non-repetitive integer. The total digits value 1319 can be used for representation of decimal and integer values. The total digits value 1319 represents a total length sequence of decimal or integer digits. The total digits value 1319 includes the integer digits and the decimal digits. The behavior is similar as described in W3C XML Schema (Part II).

The fraction digits value 1320 can be an optional and non-repetitive integer. The fraction digits value 1320 can be used for representation of decimal values. The fraction digits value 1320 restricts a maximum number of decimal digits. The behavior is similar as described in W3C XML Schema (Part II).

The white space code 1321 can be an optional and non-repetitive token. In one example, the white space code 1321 includes the same behavior as whiteSpace that is define in W3C XML Schema (Part II). The white space code 1321 may specify one or more constraints of special characters of the content. The white space code 1321 can be one of the following values:

| Code | Name | Description |
| --- | --- | --- |
| preserve | Preserve | No normalization (changing) of the content component |
| replace | Replace | All occurrences of tab (#x9), line feed (#xA), and carriage return (#xD) are replaced with space (#x20) |
| collapse | Collapse | Additional to replace, contiguous sequences of spaces (#x20#x20 . . . ) are collapsed, and leading and trailing spaces (#x20) are truncated. |

The pattern 1322 can be an optional and non-repetitive string. The pattern 1322 can specify a constraint of the content element 1312 according to a regular expression. The representation of the pattern 1322 may be based on the regular expression defined by W3C XML Schema (Part II).

The facet 1323 can be an optionally included repetitive string. For example, the content element 1312 may include numeric and data based content that may have upper or lower limits of content. These limits can be expressed by the facet 1323 according to the conventions of some of the constraining facets of W3C XML Schema (Part II). Some example attributes, typeCode, are

| Code | Name | Description |
| --- | --- | --- |
| maxInclusive | Maximum Inclusive | Inclusive upper bound of the content component, which limits the content to less than or equal to the defined maxInclusive value. |
| maxExlusive | Maximum Exclusive | Exclusive upper bound of the content component, which limits the content to less than the defined maxExclusive value. |
| minInclusive | Minimum Inclusive | Inclusive lower bound of the content component, which limits the content to greater than or equal to the defined minInclusive value. |
| minExclusive | Minimum Exclusive | Exclusive lower bound of the content component, which limits the content to greater than the defined minExclusive value. |

The fixed length fill signs 1324 can be an optional and repetitive string. For example, the fixed length fill signs 1324 can define the character that should be used to fill the content element 1312 to the predefined fixed length specified in the fixed length value element. Some example attributes of the typeCode for defining the type of alignment are

| Code | Name | Description |
| --- | --- | --- |
| left | Left Alignment | The content should be left aligned (e.g., preferred for string based content) |
| right | Right Alignment | The content should be right aligned (preferred for numeric based content) |
| middle | Middle Alignment | The context should be represented in the middle of the fixed content length |

The position element 1325 can be an optional and repetitive (e.g., unbounded). The position element 1325 can define an absolute position of the artifact in the whole schema. A specific artifact can be shown on several positions within the schema. Therefore, the position element 1325 can be repeated for each of the positions in the artifact. Some types, such as the complexType and the simpleType may not need position information. A root element, such as the first element of a message, may have the expression "//". Each of the nested elements and attributes may be associated to one or more of the position elements 1325.

The position element 1325 includes a XPath subchapter 1326, a trigger indicator 1327, and a qualifies artifact 1328. The XPath subchapter 1326 can be a mandatory and repetitive string. For example, the position element 1325 can be described as an absolute path according to a XML Path Language (XPath) 2.0. The XPath subchapter 1326 can explain the specific artifact that may need to be used. For example, the element can occur at many distinct positions in an instance. Using the XPath subchapter 1326, possible paths for the artifact can be entered. In some examples, the ssa:XPath entry may be used for the complex Types (e.g., ABIES) only because BDTs may be very generic and may have extremely many possible positions.

The trigger indicator 1329 can be an optional and non-repetitive boolean flag or parameter. The trigger indicator 1329 can indicate one or more trigger behaviors of an associated element. The trigger indicator 1329 can especially indicate this trigger behavior and need not be used for the syntax "XML because some source schemas have specific artifacts that may have a trigger behavior. For example, an instantiation of this artifact may be also the beginning of a new group of segments or elements. For example, all following groups or elements may belong to this group until the same artifact may be instantiated. The default of the trigger indicator 1329 is "false", which means that the artifact has no trigger behavior.

The qualifies artifact 1328 can be an optional and non-repetitive boolean flag or parameter 1328. For example, the qualifies artifact 1328 can be used if the specific artifact provides some additional semantics that qualifies another artifact more precisely. The another artifact can be expressed by the absolute path according XML Path Language (XPath) 2.0. The XPath subchapter 1326 specifies the specific artifact that should be used.

The processing element 1329 can be optional and non-repetitive. The processing element 1329 can include instructions to software or users that receive and process the instance. The processing element 1329 includes a rule 1330. The rule 1330 can be an optional and repetitive (e.g., unbounded) string. The rule 1330 may include rules from some B2B libraries, some migration guidelines, additional constraint rules, or integrity conditions, which can be described in freestyle or even according to constraint languages, such as an object constraint language (OCL). The rule 1330 includes a typeCode attribute that is an optionally included token. The typeCode attribute defines the kind of representations. The following example codes can be used.

| Code | Name | Description |
| --- | --- | --- |
| Freestyle | | Definition of a constraint in freeform text or by a human readable text definition |
| OCL | Object Constraint Language | Definition of a constraint according to a similar technology as the formal constraint language Object Constraints Language (OCL) that provides constraint and object query expressions. |
| XSLT | XML Stylesheet Language Transformation | Definition of a constraint according to the XML Stylesheet Language Transformation (XSLT) |

The rule 1330 optionally includes a direction attribute. The direction attribute can be a token that defines a direction that a specific rule takes effect. Some example directions are as follows.

| Code | Name | Description |
| --- | --- | --- |
| both | Source ↔ CCTS | Processing in both directions, which are from instance based on source schema into instance based on CCTS schema, and vice versa. |
| in | Source → CCTS | Processing from instance based on source schema into instance based on CCTS schema. |
| out | CCTS → Source | Processing from instance based on CCTS schema into instance based on source schema. |

The rule 1330 also includes an attribute orderNumber that is an integer. For example, the orderNumber attribute may be mandatory. The orderNumber attribute can be used for definition of a sequence number.

The RTMF uses regular expression to describe date, time, and duration. In general, the regular expressions of "Date", "Time", and "Duration" differ from other regular expressions that are used for strings or numeric representations. In some implementations, the RTMF uses a regular expression convention to represent date, time, and duration with a combination of ISO 8601, and UN/EDIFACT Trade Data Element 2379—Date or time or period format code. In some examples, the convention may be very flexible in order to define a large umber of alternative representation of dates, time and time intervals that are used in B2B applications.

For example, the following convention can be used.

[S] is used to represent a specific date/time/period character only means that the specific date/time value will be represented only.

[{n} S] is used to represent a number of digits in curly brackets+specific date/time/period character represents digit from a positive integer or zero.

[{n}] is used to represent a digit from a positive integer or zero. For example, {1} represents one fixed digit, and {2} represents two fixed digits.

[{n,m}] is used to represent from a number of digits to a number of digits in form of positive integer or zero. For example, {0,2} represents zero to two digits.

[{0,}] is used to represent a minimum number of digits that is a positive integer or zero.

[cl:] is a Namespace token of a specific code list if values are considered in diverse code lists. The namespace token should be valid and the specific code list should be imported.

[±] is used to represent a plus sign [+] if in combination with the following element a positive value or zero needs to be represented (in this case, unless explicitly stated otherwise, the plus sign shall not be omitted), or a minus sign [−] if in combination with the following element a negative value needs to be represented.

P is used as a duration designator, preceding the component which represents the duration.

R is used as a recurring time interval designator.

T is used as a time designator to indicate, for example, a start of the representation of local time to designate local time expressions, a start of the representation of the time of day in date and time of day expressions, or a start of the representation of the number of hours, minutes or seconds in expressions of duration.

[::,.-_|/+[ ]{ }]* are allowed separation designators. According to ISO 8601, a colon [:] is used to separate the time elements (e.g., between "hour" and "minute" and between "minute" and "second"), solidus [/] is used to separate components in the representation of time intervals and recurring time intervals, and a hyphen [-] is used to separate the time elements (e.g., "year" and "month", "year" and "week", "year" and "day", "month" and "day", and "week" and "day").

In a regular expression, date, time, or duration follow a format. The format can be specified using a convention described below.

[C] represents a digit used in the time element "century". Various representations of the century time element can be used. For example, a century can be represented as CC with a range 00-99. In another example, a century can also be represented as nnC with a range 00C-99C.

[Y] represents a digit used in the time element "year". For example, a year can be represented as YY with a range 00-99.

[S] represents a digit used in the time element "semester".

[Q] represents a digit used in the time element "quarter".

[M] represents a digit used in the time element "month". For example, a month can have a range of 1-12 representing 12 months of a year.

[B] represents a digit used in the time element "half-month". For example, "1" can represent a first half month, and "2" can represent a second half month.

[D] represents a digit used in the time element "day". For example, a range 1-28 is used to represent exactly 28 days in a month 02. In another example, a range 1-29 is used to represent exactly 29 days in month 02 when the year is a leap year. In another example, a range 1-30 is used to represents exactly 30 days in months 04, 06, 09, and 11. In another example, a range 1-31 is used to represent exactly 31 days in months 01, 03, 05, 07, 08, 10, and 12.

[w] represents a digit used in the time element "week".

[h] represents a digit used in the time element "hour". For example, a range 0-23 is used to represent exactly 24 hours.

[m] represents a digit used in the time element "minute". For example, a range 0-59 is used to represent exactly 60 minutes

[s] represents a digit used in the time element "second". For example, a range 0-59 is used to represent exactly 60 seconds.

[W] is used as a week designator, preceding a data element which represents the ordinal number of a calendar week within the calendar year.

[Z] is used as a coordinated Universal Time (UTC) designator for specifying a time zone.

For example, suppose C=Century, Y=Year; M=Month, D=Day, H=Hour;

M=Minute, S=Second. YYDDD can be used to represent a calendar day (e.g., 1 Jan. 2007 can be represented as 07001).

For example, MMDD can be used to represent a day of a month. For example, DDD can be used to represent a day's number within a specific year. For example, WW can be used to represent a week's number within a specific year. MM can be used to represent a month's number within a specific year. DD can be used to represent a day's number within is a specific month. YYMMDDHHMM can be used to represent a calendar date including time without seconds. To specify a time zone to represent the calendar date, YYMMDDHHMZZZ can be used, where Z=Time zone. YYMMDDHHMMSS can be used to represent a calendar date including time with seconds. To specify a time zone to represent the calendar date, YYMMDDHHMMSSZZZ can be used, where Z=Time zone. CCYYMMDDHHMM can be used to represent a calendar date including time with minutes. To specify a time zone to represent the calendar date, CCYYMMDDHHMMZZZ can be used, where Z=Time zone. CCYYMMDDHHMMSS can be used to represent a calendar date including time with seconds. To specify a time zone to represent the calendar date, CCYYMMDDHHMMSSZZZ can be used, where Z=Time zone. CCYYMMDDHHMMZHHMM can be used to represent a calendar date including time and time zone expressed in hours and minutes. For example, ZHHMM can be used to represent a time zone given as offset from UTC.

MMDDHHMM can be used to represent a month, day, hours, minutes, in which M=Month; D=Day; H=Hour; M=Minute. DDHHMM can be used to represent a day, hours, minutes, in which D=Day; H=Hour; M=Minute. HHmm can be used to represent a time without seconds, in which H=Hour; m=Minute. HHmmss can be used to represent a time with seconds, in which H=Hour; m=Minute; s=Seconds. To specify a time zone of the time, HHmmssZZZ can be used, where Z=Time zone.

mmmmss can be used to represent a time without hours, in which m=minutes, s=seconds. ZHHMM can be used to represent an offset from UTC where Z is a plus or a minus sign. HHmmHHmm can be used to represent a time span without seconds, in which H=Hour; m=Minute.

HHMMSS-HHMMSS can be used to represent a period of time specified by giving the start time followed by the end time (e.g., both expressed by hours minutes and seconds). Data is to be transmitted as consecutive characters without hyphen. HHMMSSZZZ-HHMMSSZZZ can be used to represent a period of time specified by giving the start time followed by the end time (both expressed by hours minutes, seconds and time zone). Data is to be transmitted as consecutive characters without hyphen.

CC can be used to represent a century. YY can be used to represent a calendar year, in which Y=Year. CCYY can be used to represent a calendar year including century, in which C=Century, and Y=Year. YYS can be used to represent a semester in a calendar year, in which Y=Year; S=Semester. CCYYS can be used to represent a semester in a calendar year, in which C=Century; Y=Year; S=Semester. CCYYQ can be used to represent a quarter in a calendar year, in which C=Century; Y=Year; Q=Quarter. YYMM can be used to represent a month within a calendar year, in which Y=Year; M=Month. CCYYMM can be used to represent a month within a calendar year, in which CC=Century; Y=Year; M=Month.

YYMMA can be used to represent a ten-day period within a month of a year (A=a ten day period). CCYYMMA can be used to represent a ten-day period within a month of a year, including century. YYWW can be used to represent a week within a calendar year, in which Y=Year; W=Week (e.g., 1st week of January=week 01). CCYYWW can be used to represent a week within a calendar year, in which CC=Century;

Y=Year; W=Week. YY-YY can be used to represent a period of time specified by giving the start year followed by the end year without indicating a century. For example, data can be transmitted as consecutive characters without hyphen. CCYY-CCYY can be used to represent a period of time specified by giving the start year followed by the end year without indicating a century. Data is to be transmitted as consecutive characters without hyphen.

YYS-YYS can be used to represent a period of time specified by giving the start semester of a year followed by the end semester of a without indicating a century. Data is to be transmitted as consecutive characters without hyphen. CCYYS-CCYYS can be used to represent a period of time specified by giving the start semester of a year followed by the end semester of a year without indicating a century. Data is to be transmitted as consecutive characters without hyphen. YYPYYP can be used to represent a format of period to be given without hyphen (e.g., P=period of 4 months).

CCYYP-CCYYP can be used to represent a format of period to be given without hyphen. YYQ-YYQ can be used to represent a period of time specified by giving the start quarter of a year followed by the end quarter of year without indicating a century. Data is to be transmitted as consecutive characters without hyphen. CCYYQ-CCYYQ can be used to represent a period of time specified by giving the start quarter of a year followed by the end quarter of year with both including a century. Data is to be transmitted as consecutive characters without hyphen. YYMM-YYMM can be used to represent a period of time specified by giving the start month of a year followed by the end month of a year without including a century. Data is to be transmitted as consecutive characters without hyphen. CCYYMM-CCYYMM can be used to represent a period of time specified by giving the start month of a year followed by the end month of a year with both time including a century. Data is to be transmitted as consecutive characters without hyphen. YYMMDDHHMM-YYMMDDHHMM can be used to represent a period of time specified by giving the start time followed by the end time. Data is to be transmitted as consecutive characters without hyphen. YYWW-YYWW can be used to represent a period of time specified by giving the start week of a year followed by the end week of year without including a century. Data is to be transmitted as consecutive characters without hyphen. CCYYWW-CCYYWW can be used to represent a period of time specified by giving the start week of a year followed by the end week of year with both times including a century. Data is to be transmitted as consecutive characters without hyphen. YYMMDD-YYMMDD can be used to represent a period of time specified by giving the start date followed by the end date, not including century. Data is to be transmitted as consecutive characters without hyphen. CCYYMMDD-CCYYMMDD can be used to represent a period of time specified by giving the start date followed by the end date, including century. Data is to be transmitted as consecutive characters without hyphen. CCYYMMDDHHMM-CCYYMMDDHHMM can be used to represent a period of time which includes the century, year, month, day, hour and minute. Format of period to be given in actual message may be without hyphen. DHHMM-DHHMM can be used to represent a format of period to be given without hyphen, in which D=day of the week (e.g., 1=Monday; 2=Tuesday; . . . , 7=Sunday).

The table below entitled "Example Purchase Order" includes an example schema representation of an UN/EDIFACT purchase order serialized in RTMF. The schema representation includes example codes having structures corresponding to the description above with reference to FIGS. 10-13. For example, the schema representation has a primary construct as described above with regard to the code 1000. For example, the schema representation includes code sections of documentation elements (the code 1100), business context elements (the code 1200), and schema artifacts (the code 1300). In one example, the schema representation can be used as an input to the process 400. For example, the process 400 can extract information, such as DENs and business context, of the artifacts specified in the RTMF schema. Using the information extracted from the RTMF schema, the process 400 can generate mappings for the artifacts.

Figure 14:
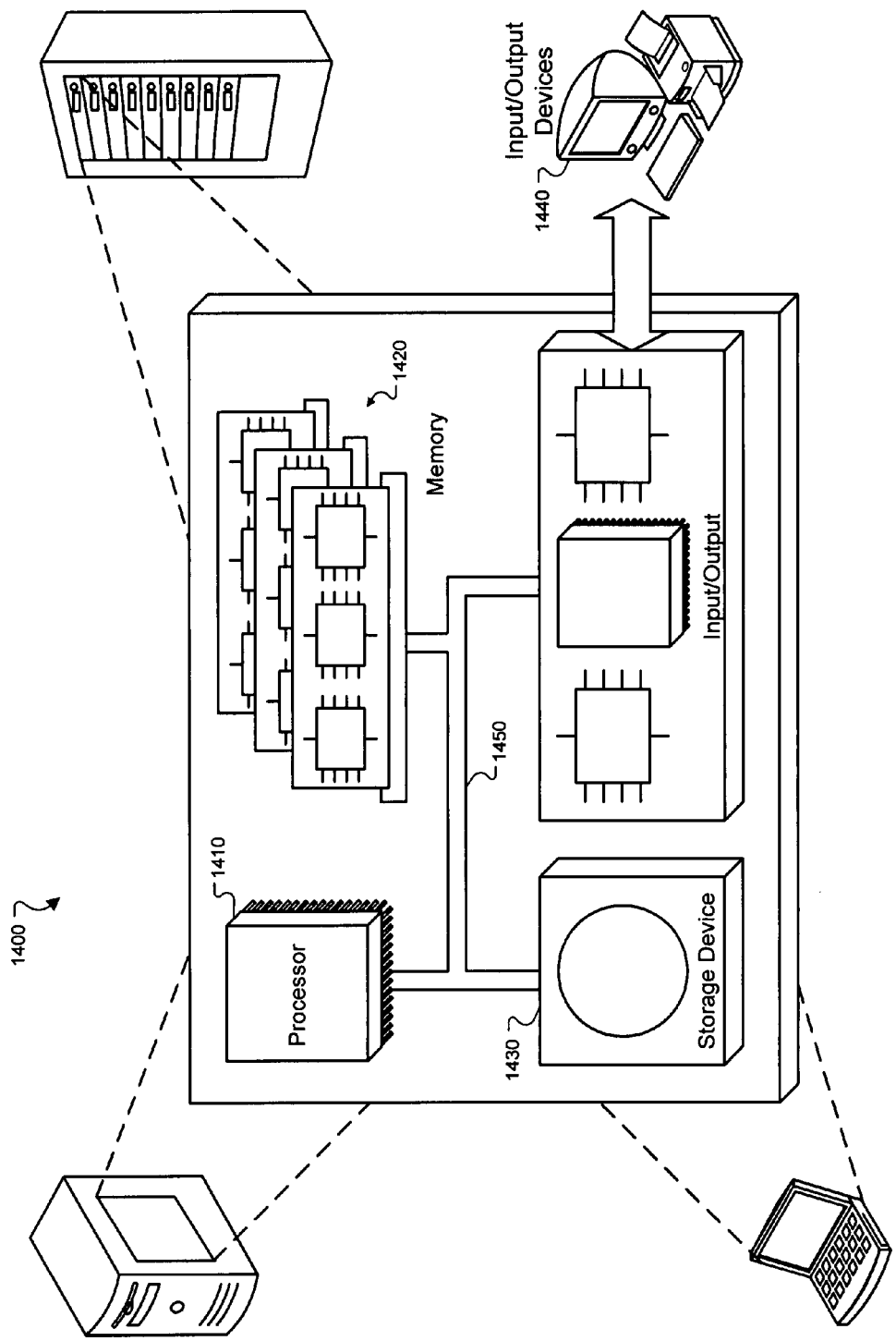
FIG. 14 is a block diagram of a computing system that can be used in connection with computer-implemented methods described in this document.

FIG. 14 is a schematic diagram of a generic computer system 1400. The system 1400 can be used for the operations described in association with any of the computer-implement methods described previously, according to one implementation. The system 1400 includes a processor 1410, a memory 1420, a storage device 1430, and an input/output device 1440. Each of the components 1410, 1420, 1430, and 1440 are interconnected using a system bus 1450. The processor 1410 is capable of processing instructions for execution within the system 1400. In one implementation, the processor 1410 is a single-threaded processor. In another implementation, the processor 1410 is a multi-threaded processor. The processor 1410 is capable of processing instructions stored in the memory 1420 or on the storage device 1430 to display graphical information for a user interface on the input/output device 1440.

The memory 1420 stores information within the system 1400. In one implementation, the memory 1420 is a computer-readable medium. In one implementation, the memory 1420 is a volatile memory unit. In another implementation, the memory 1420 is a non-volatile memory unit.

The storage device 1430 is capable of providing mass storage for the system 1400. In one implementation, the storage device 1430 is a computer-readable medium. In various different implementations, the storage device 1430 may be a floppy disk device, a hard disk device, an optical disk device, or a tape device.

The input/output device 1440 provides input/output operations for the system 1400. In one implementation, the input/output device 1440 includes a keyboard and/or pointing device. In another implementation, the input/output device 1440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for mapping a first schema to a second schema, the method comprising:
identifying a first schema that includes a plurality of first data element definitions, each of the first data element definitions defining a semantic of a data portion in first electronic documents that are generated according to a format of the first schema, wherein each of the first data element definitions in the first schema is uniquely identified by a respective first name;
receiving an indication that the first schema is to be mapped to a second schema, the first and second schemas being different from each other such that a computer system configured according to the second schema is unable to semantically interpret the first electronic documents,
wherein a naming rule specifies a process to generate a name for a data element from a human-understandable description for the data element by performing linguistic analysis on the human-understandable description for the data element,
wherein each of multiple second data element definitions in the second schema is uniquely identified by a respective second name generated using the naming rule,
wherein the first names that identify the first data element definitions in the first schema are not generated using the naming rule;
generating a new name for each of the first data element definitions from the human-understandable description for each of the first data element definitions by applying the process that is specified by the naming rule to the human-understandable description for each of the first data element definitions, wherein the second names and the new names are defined by Core Components Technical Specification (CCTS) standard, and wherein the first names are not defined by the CCTS standard; and
mapping at least one of the first data element definitions in the first schema to a corresponding one of the second data element definitions in the second schema based on the new name for the one of the first data element definitions in the first schema matching the second name of the one of the second data element definition in the second schema.

2. The method of claim 1, wherein the new name of the first data element definition matches the second name of the second data element definition by being a same name as the second name.

3. The method of claim 1, further comprising:
determining that none of the second names are same as a particular new name of a particular first data element definition; and in response:
(i) adding a new data element definition to the second schema, a name of the new data element definition being same as the particular new name, and
(ii) mapping the particular first data element definition to the new data element definition.

4. The method of claim 1, wherein the second name for each second data element definition is unique among all second names of second data element definitions in the second schema.

5. The method of claim 1, wherein each first data element definition is associated with a context value that is in the first schema, wherein each second data element definition is associated with a context value that is in the second schema, and wherein the mapping is further based on the context value for the first data element definition matching the context value for the second data element definition.

6. The method of claim 1, wherein generating the new name for each first data element definition comprises transforming the first schema into a transformed schema, wherein the transformed schema includes, for each first data element definition in the first schema, a corresponding transformed data element definition that is uniquely identified by the new name for the corresponding first data element definition, and wherein each transformed data element definition identifies a first name of the corresponding first data element definition.

7. The method of claim 1, wherein generating the new name for each first data element definition comprises:
receiving a human-understandable description of a specific first data element definition for which a new name is to be created, the new name complying with a predefined name format that is same as a predefined name format of the second names;

identifying a noun phrase and a verb phrase in the human-understandable description; and generating the new name using a first noun obtained from the noun phrase and a second noun obtained from the verb phrase.

8. The method of claim 7, wherein identifying the noun phrase and the verb phrase includes generating a hierarchical tree for the human-understandable description.

9. The method of claim 7, wherein the predefined name format requires the new name to comprise at least a first term for an object class to which the specific first data element definition relates, and wherein the second noun is used as the first term.

10. The method of claim 9, wherein the predefined name format requires the new name to comprise also a second term for a property of the object class, and wherein another noun associated with the verb phrase is used as the second term.

11. The method of claim 10, wherein the predefined name format requires the new name to comprise also a third term for a representation form of the specific first data element definition, and wherein the first noun is used as the third term.

12. The computer program product of claim 1, further comprising:

presenting the mapping of the at least one of the first data element definitions in the first schema to the corresponding one of the second data element definitions in the second schema to a user as a suggestion which the user can at least accept or reject; and receiving user input that the user accepts the presented mapping;

wherein the mapping of the at least one of the first data element definitions in the first schema to the corresponding one of the second data element definitions in the second schema is performed in response to receiving the user input.

13. A computer program product tangibly embodied in a non-transitory computer-readable storage medium and comprising instructions that when executed by a processor perform a method for creating a mapping, the method comprising:

identifying a first schema that includes a plurality of first data element definitions, each of the first data element definitions defining a semantic of a data portion in first electronic documents that are generated according to a format of the first schema, wherein each of the first data element definitions in the first schema is uniquely identified by a respective first name;

receiving an indication that the first schema is to be mapped to a second schema, the first and second schemas being different from each other such that a computer system configured according to the second schema is unable to semantically interpret the first electronic documents, wherein a naming rule specifies a process to generate a name for a data element from a human-understandable description for the data element by performing linguistic analysis on the human-understandable description for the data element, wherein each of multiple second data element definitions in the second schema is uniquely identified by a respective second name generated using the naming rule, wherein the first names that identify the first data element definitions in the first schema are not generated using the naming rule;

generating a new name for each of the first data element definitions from the human-understandable description for each of the first data element definitions by applying the process that is specified by the naming rule to the human-understandable description for each of the first data element definitions, wherein the second names and the new names are defined by Core Components Technical Specification (CCTS) standard, and wherein the first names are not defined by the CCTS standard; and mapping at least one of the first data element definitions in the first schema to a corresponding one of the second data element definitions in the second schema based on the new name for the one of the first data element definitions in the first schema matching the second name of the one of the second data element definition in the second schema.

14. The computer program product of claim 13, wherein the method further comprises:

determining that none of the second names are same as a particular new name of a particular first data element definition; and in response:

(i) adding a new data element definition to the second schema, a name of the new data element definition being same as the particular new name, and (ii) mapping the particular first data element definition to the new data element definition.

15. The computer program product of claim 13, wherein the second name for each second data element definition is unique among all second names of second data element definitions in the second schema.

16. The computer program product of claim 13, wherein generating the new name for each first data element definition comprises transforming the first schema into a transformed schema, wherein the transformed schema includes, for each first data element definition in the first schema, a corresponding transformed data element definition that is uniquely identified by the new name for the corresponding first data element definition, and wherein each transformed data element definition identifies a first name of the corresponding first data element definition.

17. The computer program product of claim 13, wherein generating the new name for each first data element definition comprises:

receiving a human-understandable description of a specific first data element definition for which a new name is to be created, the new name complying with a predefined name format that is same as a predefined name format of the second names;

identifying a noun phrase and a verb phrase in the human-understandable description; and generating the new name using a first noun obtained from the noun phrase and a second noun obtained from the verb phrase.

18. The system of claim 13, wherein the operations further comprise:

presenting the mapping of the at least one of the first data element definitions in the first schema to the corresponding one of the second data element definitions in the second schema to a user as a suggestion which the user can at least accept or reject; and receiving user input that the user accepts the presented mapping;

wherein the mapping of the at least one of the first data element definitions in the first schema to the corresponding one of the second data element definitions in the second schema is performed in response to receiving the user input.

19. A computer system comprising:

a non-transitory computer-readable storage medium comprising instructions;

one or more processors configured to execute the instructions to perform operations comprising:

identifying a first schema that includes a plurality of first data element definitions, each of the first data element definitions defining a semantic of a data portion in first electronic documents that are generated according to a format of the first schema, wherein each of the first data element definitions in the first schema is uniquely identified by a respective first name;

receiving an indication that the first schema is to be mapped to a second schema, the first and second schemas being different from each other such that a computer system configured according to the second schema is unable to semantically interpret the first electronic documents, wherein a naming rule specifies a process to generate a name for a data element from a human-understandable description for the data element by performing linguistic analysis on the human-understandable description for the data element, wherein each of multiple second data element definitions in the second schema is uniquely identified by a respective second name generated using the naming rule, wherein the first names that identify the first data element definitions in the first schema are not generated using the naming rule;

generating a new name for each of the first data element definitions from the human-understandable description for each of the first data element definitions by applying the process that is specified by the naming rule to the human-understandable description for each of the first data element definitions, wherein the second names and the new names are defined by Core Components Technical Specification (CCTS) standard, and wherein the first names are not defined by the CCTS standard; and mapping at least one of the first data element definitions in the first schema to a corresponding one of the second data element definitions in the second schema based on the new name for the one of the first data element definitions in the first schema matching the second name of the one of the second data element definition in the second schema.

20. The system of claim 19, wherein the operations further comprise:

determining that none of the second names are same as a particular new name of a particular first data element definition; and in response:

(i) adding a new data element definition to the second schema, a name of the new data element definition being same as the particular new name, and (ii) mapping the particular first data element definition to the new data element definition.

21. The system of claim 19, wherein the second name for each second data element definition is unique among all second names of second data element definitions in the second schema.

22. The system of claim 19, wherein generating the new name for each first data element definition comprises transforming the first schema into a transformed schema, wherein the transformed schema includes, for each first data element definition in the first schema, a corresponding transformed data element definition that is uniquely identified by the new name for the corresponding first data element definition, and wherein each transformed data element definition identifies a first name of the corresponding first data element definition.

23. The system of claim 19, wherein generating the new name for each first data element definition comprises:

receiving a human-understandable description of a specific first data element definition for which a new name is to be created, the new name complying with a predefined name format that is same as a predefined name format of the second names;

identifying a noun phrase and a verb phrase in the human-understandable description; and generating the new name using a first noun obtained from the noun phrase and a second noun obtained from the verb phrase.

24. The system of claim 19, wherein the operations further comprise:

presenting the mapping of the at least one of the first data element definitions in the first schema to the corresponding one of the second data element definitions in the second schema to a user as a suggestion which the user can at least accept or reject; and receiving user input that the user accepts the presented mapping;

wherein the mapping of the at least one of the first data element definitions in the first schema to the corresponding one of the second data element definitions in the second schema is performed in response to receiving the user input.

\* \* \* \* \*